(12) United States Patent
Uchiyama et al.

(10) Patent No.: US 6,278,471 B1
(45) Date of Patent: Aug. 21, 2001

(54) IMAGE FORMING APPARATUS WITH LIGHT-SCANNING UNIT HAVING SUPPORTING MEMBER

(75) Inventors: Hiroaki Uchiyama, Kitakatsuragi-gun; Toshio Yamanaka, Yao; Ayumu Oda, Nara; Kyosuke Taka, Nara; Yoshikazu Harada, Nara; Norio Tomita; Nobuo Manabe, both of Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/501,365

(22) Filed: Feb. 10, 2000

(30) Foreign Application Priority Data

Feb. 15, 1999 (JP) .................................................. 11-036412
Feb. 17, 1999 (JP) .................................................. 11-039123

(51) Int. Cl.$^7$ ............................. B41J 2/385; G03G 13/04
(52) U.S. Cl. ......................... 347/138; 347/245; 347/263
(58) Field of Search ........................... 399/118; 347/129, 347/138, 152, 245, 263

(56) References Cited

U.S. PATENT DOCUMENTS

| 5,237,348 | * | 8/1993 | Blanding et al. . | |
| 5,333,008 | * | 7/1994 | Nowak et al. . | |
| 5,374,993 | * | 12/1994 | Diehl et al. | 347/138 X |
| 5,477,306 | * | 12/1995 | Iguchi et al. | 347/152 X |
| 5,760,818 | * | 6/1998 | Hinton et al. | 347/263 |
| 5,764,269 | | 6/1998 | Takeshita et al. | 347/233 |
| 6,046,759 | * | 4/2000 | Kim | 347/263 |

FOREIGN PATENT DOCUMENTS 310486   3/1991 (JP) .
7325238 12/1995 (JP) .

* cited by examiner

Primary Examiner—Sandra Brase
(74) Attorney, Agent, or Firm—Renner, Otto, Boisselle, Sklar

(57) ABSTRACT

An object of the invention is to reproduce a faithful image irrespective of thermal expansion of a light-scanning unit and to reproduce a faithful image without enhancing the strength of the light-scanning unit excessively. A pair of supporting portions of a light-scanning unit, each having a flat face, are supported in linear contact with a right column-shaped supporting member provided with the apparatus body. The light-scanning unit is provided on the supporting member near to a starting position where writing image data on a photosensitive body with a scanning line is started in a main scanning direction so as not to be mutually displaced relative to the supporting member. Thereby, the light-scanning unit is allowed to extend in the longitudinal direction of the supporting member due to thermal expansion of the light-scanning unit. Also, an elongated supporting member made of stainless steel penetrates a base body of a light-scanning unit made of synthetic resin which scans in scanning line of laser light on the photosensitive body to exposure, to support the light-scanning unit. The center of gravity of the light-scanning unit is positioned near to the supporting member and vertically below the supporting member, to make the moment acting on the light-scanning unit small and hold the light-scanning unit in a stable state. The supporting member suppresses deformation of the base body due to thermal expansion.

9 Claims, 13 Drawing Sheets

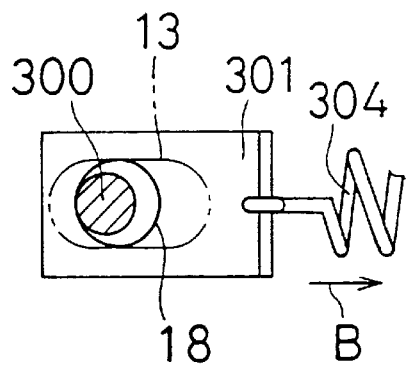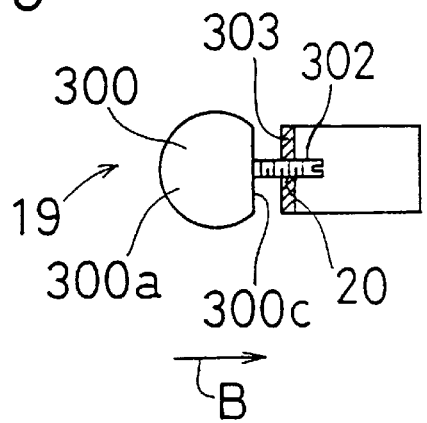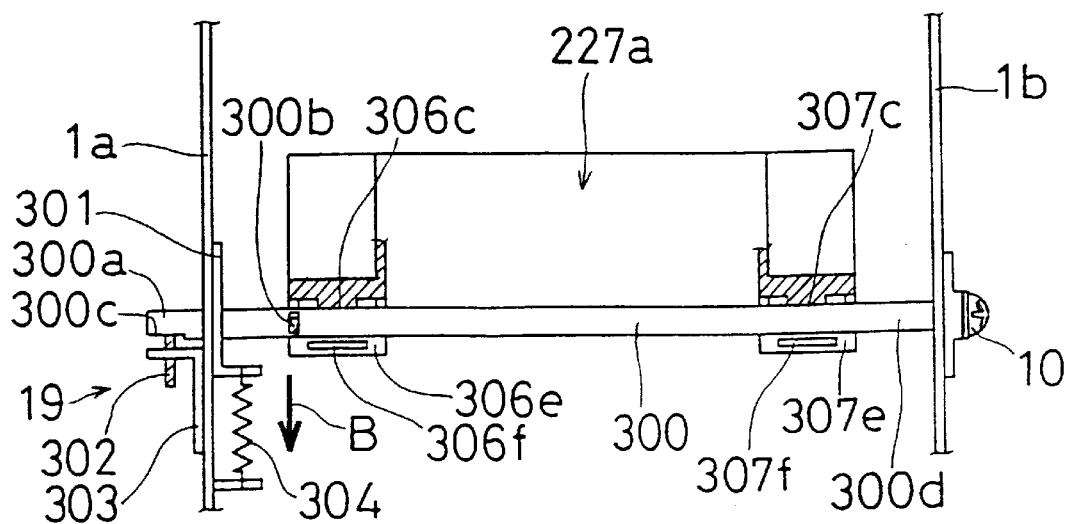

IMAGE FORMING APPARATUS WITH LIGHT-SCANNING UNIT HAVING SUPPORTING MEMBER

BACKGROUND OF THE INVENTION

1. Field of the Invention

The present invention relates to an image forming apparatus of an electrophotographic system, such as a printer, a copying machine or the like, where an image is recorded on a photosensitive body by scanning a surface of the photosensitive body with scanning lines comprising light beams which have been modulated with image data by a light-scanning unit, and particularly to a mounting structure of a light-scanning unit.

2. Description of the Related Art

As image forming apparatuses employing laser-beam scanning, a laser printer, a copying machine and a digital copying machine have been commercialized. In a field of such digital image recording apparatuses, high accuracy of assembling is required and respective elements or parts are unitized to improve productivity so that reduction in manufacturing cost and commercial price can be facilitated. Recently, in order to suppress a space for installing an apparatus to the minimum one, compact sizing or downsizing of the apparatus itself has been advanced.

In a currently popular color digital copying machine, after predetermined processing is performed on respective color separation images of an original input from a scanner, images are formed for respective colors by a plurality of image forming sections provided to corresponding to the respective colors and these images are sequentially transferred on a recording sheet of paper conveyed by a transferring/conveying belt in a superimposing manner to obtain one color image. In such a color copying machine, respective color images are reproduced faithfully and the respective color images are superimposed on the recording sheet with a high accuracy so that image representation included in the original image having no color shear can be reproduced faithfully without being injured.

However, when compact-sizing is facilitated, there occurs a problem that components or parts inside the apparatus are made close to one another to interfere with one another. Particularly, when the interior of the apparatus is elevated up to a high temperature due to heat generated from such a heat source as a fusing or fixing device, distortion, flexure, torsion or the like occurs in an optical device section due to thermal expansions of respective components, which results in adverse influence on an image recorded in an image writing step.

In order to overcome such an influence due to such heat, conventionally, when ozone, scattering materials and the like generated inside the apparatus are exhausted outside the apparatus through a filter, inside air including ozone, scattering materials and the like is exhausted to pass near to such a heat source as heat fixing means so that heated atmosphere is also exhausted together with ozone, scattering materials and the like. Such a countermeasure is not concluded to be sufficient as a countermeasure for reducing influences such as distortion, flexure, torsion and the like of devices inside the apparatus which are generated due to heat. Also, in a color copying machine having a plurality of light-scanning units corresponding to respective colors, since the respective light-scanning units are individually influenced adversely due to thermal expansion, when respective images are superimposed, color shear appears, thus, an adverse influence being remarkable.

Also, in an image forming apparatus wherein light-scanning recording is performed in a conventional electrophotographic system, for example, a digital copying machine or a printer, a drum-shaped photosensitive body or member which is an image carrier and a light-scanning unit are positioned with a predetermined positional relationship therebetween, and an image is recorded and reproduced by exposure-scanning a surface of the image carrier with light-beams which have been modulated on the basis of image data. In this light-scanning recording apparatus, the positional relationship between the photosensitive body and the light-scanning unit influences the quality of image recorded and reproduced, and further distortion or the like generated in optical elements or parts of a scanning optical system which are optical components also influences the image quality of an image recorded and reproduced.

In Japanese Examined Utility Model Publication JP-Y2 3-10486 (1991) which is one conventional art, for example, a semiconductor laser device, a multi-facet mirror which is a polygon mirror, lenses, mirrors and the like, these members constituting a scanning optical system of a laser scanning device, are respectively fixed at predetermined positions on a supporting body or member which is a base body. For strengthening the base body itself and suppressing the coefficient of thermal expansion thereof, the base body is a molted product made of synthetic resin mixed with glass fibers, for example, synthetic resin of polycarbonate, polyphenylene sulfite, epoxy, or polyester systems and is formed in a box-shape. This supporting body is mounted on a metal base such as an aluminum plate, a steel plate or the like, and a surface of the photosensitive body is light-scanned to record an image. The supporting body for supporting the semiconductor laser device, the multi-facet mirror, the lenses, the mirrors and the like which constituting the this scanning optical system must be mounted on the metal base in a stable state. Otherwise, distortion occurs in the supporting body and it becomes impossible to record and reproduce an image faithfully.

In general, in view of workability for assembling an apparatus, a manufacturing technique is conventionally performed that elements to be unitized are preliminarily prepared as respective units and, after assembling is performed for each unit, these units are assembled in the apparatus. Here, it is best preferable that respective optical parts for the light-scanning unit which may influence the image quality of an image recorded and reproduced are firmly assembled at predetermined positions on the supporting body to complete these parts as one unit. Respective completed units are not used immediately for assembling an apparatus as they are, but these units are assembled as an apparatus via transportation, parts management and the like. Therefore, each unit must have a structure which can bear any environment such as strength, thermal expansion or the like of the supporting body. However, there is a limitation in improvement in the strength of the supporting body in view of cost, size, weight and the like.

In Japanese Unexamined Patent Publication JP-A 7-325238 (1995) which is another conventional art, there has been disclosed a configuration for positioning and adjusting a light-scanning unit to an apparatus body. The configuration will be briefly explained. A photosensitive body is rotatably supported between a front side plate and a rear side plate, and further a top plate, a pair of shafts made of a stainless steel and a light-scanning unit held on the shafts are supported above the photosensitive body. In the light-scanning unit, a holding member provided at a lower face thereof is engaged with the pair of shafts, and the holding member is engaged with the shafts made of a stainless steel and moreover, a boss fixed to the light-scanning unit in a downwardly projecting manner is engaged with an elongated hole formed in the top plate of the apparatus body. Adjustment of a scanning line position of a laser light is performed by moving ends of the shafts positioned at a side of the rear side plate. The light-scanning unit is mounted and supported on the shafts provided at the apparatus body and the shafts are shifted or displaced so that adjustment of an image writing position of the light-scanning unit to a drum surface of the photosensitive body is performed.

In this conventional art, since the light-scanning unit is mounted and supported on the pair of shafts, the degree of freedom is low due to a positional relationship between the light-scanning unit and the supporting points of the light-scanning unit on the shafts. Also, when distortion due to heat occurs in the light-scanning unit, influence of such a distortion on the image quality of an image becomes large. Therefore, it is necessary to increase the strength of a frame of the light-scanning unit in order to suppress distortion occurring in the light-scanning unit as much as possible, but such an increase in strength results in increase in manufacturing cost and weight of the light-scanning unit.

SUMMARY OF THE INVENTION

An object of the invention is to provide an image forming apparatus capable of faithfully recording and reproducing an image even when a light-scanning unit is thermally expanded.

Another object of the invention is to provide an image forming apparatus capable of faithfully recording and reproducing an image without increasing the strength of a light-scanning unit, irrespective of the thermal expansion of the light-scanning unit or the like.

The invention relates to an image forming apparatus comprising:

a photosensitive body; and light-scanning unit for forming an electrostatic latent image on the photosensitive body with exposure, the light-scanning unit being supported on a supporting member which is mounted on an apparatus body and extends in a predetermined direction, so as to be prevented from being displaced at one position of the supporting member in the predetermined direction by displacement preventing means and so as to be mutually displaceable relative to the supporting member at any position other than a position where the displacement preventing means is provided.

According to the invention, for example, in an embodiment described later, the light-scanning unit for exposing an electrostatic latent image formed on the photosensitive body to light is supported to a supporting member 300 whose supporting portions 306c, 307c are mounted on the image forming apparatus of the invention, and this supporting member extends in a predetermined direction, for example, a main or fast scanning direction, namely an axial direction of a right cylindrical photosensitive drum. This light-scanning unit is fixed to or engaged with the supporting member in one position thereof with the displacement preventing means 300b, 306a so as not to be displaced in the predetermined direction. The position where the displacement preventing means is disposed may be near to one end of the supporting member extending in the direction or may be an intermediate position along the longitudinal direction of the supporting member.

Accordingly, when the temperature inside of the image forming apparatus is elevated and the light-scanning unit is thermally expanded due to the heat, the light-scanning unit is allowed to be extended or enlarged in the direction at any position except for the position where the displacement preventing means is disposed, and an amount of extension due to the thermal expansion can be relieved in the direction. Accordingly, there is no fear of occurrence of distortion, flexure and torsion due to the extension caused by the thermal expansion of the light-scanning unit. In the light-scanning unit, optical constitution elements, for example, a light source for emitting laser light, a polygon mirror, a driving source such as a motor for driving the polygon mirror and the like are mounted on a base body or member made of such synthetic resin as polycarbonate. There is a problem that the coefficient of thermal expansion of the synthetic resin base body is relatively large, but in the invention the thermal expansion of the base body is allowed so that distortion, flexure, torsion, and the like are prevented from occurring. Accordingly, it is made possible to record and reproduce a faithful image on the photosensitive body or reproduce an image faithfully. The base body may be made of a metal such as an aluminum die cast.

According to the invention, the displacement preventing means 300b, 306a are provided at one position in a direction in which the supporting member extends when the temperature inside the image forming apparatus is elevated and the light-scanning unit is thermally expanded so as to prevent the light-scanning unit and the supporting member from displacing relative to each other. Therefore, since the light-scanning unit is supported so as to be freely displaceable in the direction in an unfixed manner at any position except for the position where the displacement preventing means are provided, an amount of extension due to the thermal expansion is relieved only in the direction. Accordingly, even when the light-scanning unit is thermally expanded, extension due to the thermal expansion can be prevented from adversely influencing an image formation as distortion, flexure, torsion, and the like of the light-scanning unit, for example the base body. As a result, it is possible to record and reproduce a faithful image on the photosensitive body by the light-scanning unit or reproduce an image faithfully.

In the image forming apparatus of the invention it is preferable that the predetermined direction is a main scanning direction, a light beam of the light-scanning unit scans in the main scanning direction on the photosensitive body, where recording of image data starts from a predetermined position on the scanning line in the main scanning direction of the photosensitive body, and the displacement preventing means is displaced near to the image data starting position in the direction.

According to the invention, the direction in which the supporting member 300 extends is the main scanning direction of the photosensitive body. When the photosensitive body is, for example, a cylindrical photosensitive drum, the main scanning direction is an axial direction of the drum, and this photosensitive body is rotationally moved about the axis in a sub-scanning direction which is a circumferential direction. The light-scanning unit exposes the photosensitive body with scanning line for scanning in the main scanning direction, and the light is modulated by image data from a predetermined constant position in the main scanning direction to start exposure for the image data.

In the invention, therefore, the position of the displacement preventing means provided so as to prevent the light-scanning unit from displacing relative to the supporting member in the direction is selected to be near to the writing starting position for image data on the scanning line. Thereby, the recording starting position of writing an image according to the image data on the photosensitive body is prevented from being changed due to the thermal expansion of the light-scanning unit, so that an image according to the image data can be accurately formed at an expected position on the photosensitive body.

According to the invention, since the extending direction of the supporting member 300 for supporting the light-scanning unit, for example, at supporting portions 306c, 307c of the light-scanning unit is a main scanning direction 11 on the photosensitive body, and the position of the displacement preventing means 300b, 306a provided at one position so as to prevent the light-scanning unit from displacing relative to the supporting member in the direction is near to a starting position 17 for writing image data on the scanning line, even when the light-scanning unit is thermally expanded, the writing starting position for image data is prevented from displacing, so that image data can be exposed at a correct position on the photosensitive body to form an electrostatic latent image on the photosensitive body.

In the image forming apparatus of the invention it is preferable that the light scanning unit is supported on the supporting member in linear contact therewith, and a position of the linear contact runs parallel to the direction.

According to the invention, the light-scanning unit, for example, a supporting portion in an embodiment described later, and the supporting member for supporting the light-scanning unit come in linear contact with each other along the position parallel to the direction in which the supporting member extends. The supporting member has, for example, a right circular cross section perpendicular to the axial line thereof and is formed in a right column shape or a right cylindrical shape, while the light-scanning unit contacting with an outer peripheral face of the supporting member is a plane face parallel to the axial line of the supporting member. Accordingly, a frictional force between the light-scanning unit and the supporting member is made small by the linear contact so that the thermal expansion of the light-scanning unit is allowed without force as compared with a surface contact or the like. Accordingly, distortion, flexure, torsion and the like due to the thermal expansion of the light-scanning unit can be prevented. The contact position is parallel to the direction, and there is no drawback that the direction of the main scanning of light effected by the light-scanning unit becomes incorrect at a time of the thermal expansion of the light-scanning unit.

According to the invention, since the light-scanning unit and the supporting member come in linear contact with each other in parallel with the direction in which the supporting member extends, it is possible to make a mutual friction force therebetween small to allow the thermal expansion/deformation of the light-scanning unit without force as compared with a surface contact or the like, and exposure on the photosensitive body can be performed in a state where a scanning line is set correctly irrespective of the thermal expansion.

In the image forming apparatus of the invention it is preferable that sets of the photosensitive bodies and the light-scanning unit are sequentially disposed respectively for a plurality of colors along a conveying path of a recording sheet of paper, and the supporting members which respectively support the respective light-scanning units extend in parallel with the direction and are provided so as to prevent the respective light-scanning units from being displaced relative to the supporting members in the direction at corresponding positions along the direction.

According to the invention, in a color image forming apparatus, a plurality of image forming means for a plurality of colors, each comprising a combination of a photosensitive body and a light-scanning unit, are sequentially disposed along the conveying path of a recording sheet of paper, respective color toner images are sequentially superimposed on a recording sheet by the respective image forming means to form one image. Thus, a color image forming apparatus of a so-called tandem configuration is realized. In this color image forming apparatus, when thermally expanded, the plurality of light-scanning units extend in the same direction (a right direction in FIG. 3) as the predetermined direction. Accordingly, a color shear is prevented from occurring when respective color toner images are superimposed, so that a faithful color image can be reproduced.

According to the invention, a plurality of image forming means each comprising a photosensitive body and a light-scanning unit are arranged in tandem, and even when the respective light-scanning units are thermally expanded, all the light-scanning units extend in the same direction parallel with each other, so that the toner images of the respective colors are superimposed correctly and a color shear can be prevented from occurring.

In the image forming apparatus of the invention it is preferable that the supporting member has one end portion held by an apparatus body and the other end portion provided displaceably in a direction perpendicular to the predetermined direction relative to the apparatus body, the other end portion is provided with holding means for positioning and adjusting the supporting member relative to the apparatus body to hold the same, the light-scanning unit has a pair of supporting portions spaced from each other in the predetermined direction of the supporting member, and the light-scanning unit is provided on the apparatus body so as to be angularly displaced about an axial line perpendicular to the direction at a position shifted from the supporting member in a side direction.

According to the invention, one end portion 300d of the supporting member is held on the apparatus body of the image forming apparatus of the invention, for example, by using a screw described later or the like, and the other end portion 300a is positioned and adjusted displaceably in a direction perpendicular to the longitudinal direction in which the supporting member extends to be held by the holding means. Supporting portions 306c, 307c of the light-scanning unit supported by the supporting member are provided so as to be spaced in the direction of the supporting member 300 in a paired manner, and the light-scanning unit is provided so as to be displaceable angularly about the axial line of a pin perpendicular to the direction between the pair of supporting portions at a position shifted from the supporting member in a side direction (a downward direction in the embodiment described later). Thus, positioning and adjusting the supporting member can be performed by the holding means and a light-scanning line L1 of the light-scanning unit is allowed easily to be formed in a main scanning direction 11 parallel to the axial line of the photosensitive body.

According to the invention, since the one end portion 300d of the supporting member 300 is held on the apparatus body of the image forming apparatus, and the other end portion 300a is held so as to be adjustable for positioning by holding means 19, the pair of supporting portion 306c, 307c is supported by the supporting member, and the light-scanning unit is provided on the apparatus body be angularly displaceable about an axial line perpendicular to the direction by a pin 412a or the like, a scanning line from the light-scanning unit is adjustable to be set in the direction accurately, and it is possible to record and reproduce a faithful image easily.

The invention also relates to an image forming apparatus comprising:

a photosensitive body; and a light-scanning unit for forming an electrostatic latent image on the photosensitive body with exposure, the light-scanning unit comprising a base body, and optical elements for exposure provided on the base body, wherein a supporting member which is mounted on an apparatus body and extends in a predetermined direction penetrates the base body to hold the base body.

According to the invention, an electrostatic latent image is formed with exposure, for example, on a drum-shaped photosensitive body by scanning lines of laser light or the like from the light-scanning unit or by light from a light-emitting diode LED array. The base body of the light-scanning unit is made of such synthetic resin as fiber reinforced polycarbonate or the like so that the weight thereof may be reduced. At this time, though the strength of the base body is relatively small, and such a thermal deformation such as distortion, flexure, torsion or the like due to thermal expansion is easy to occur in the base body, the base body is penetrated by the supporting member made of such a metal as a stainless steel, and the base body is supported by the apparatus body which is a machine body of the image forming apparatus of the invention, so that such a thermal deformation as distortion, flexure, torsion or the like due to thermal expansion can be prevented from occurring in the base body of the light-scanning unit. In the invention, the base body of the light-scanning unit may be made of material except for synthetic resin, and the supporting member may be made of material except for metal. In the invention, the supporting member penetrates the base body to support the same so that a thermal deformation due to thermal expansion of the base body can be prevented as the above.

Accordingly, an image can be recorded and reproduced on the photosensitive body faithfully by the light-scanning unit. Thus, the supporting member penetrates the base body of the light-scanning unit so that the strength of the base body of the light-scanning unit is secured to the apparatus body, and optical parts which are optical elements, for example, a light source such as a semiconductor laser device, a polygon mirror which is a rotatable multi-facet mirror, a driving source such as a motor which rotationally drives the polygon mirror, mirrors for reflecting light from the polygon mirror to introduce light to the photosensitive body, and lenses such as a fθ lens for focusing light beam on the photosensitive drum, can be positioned and held on the base body of which strength was secured in a predetermined positional relationship. Accordingly, even when the strength of the base body is not increased excessively, such deformation as distortion, flexure, torsion or the like in the optical elements is reduced, thereby reducing adverse influence on the image quality of an image recorded and allowing recording and reproducing of a faithful image.

Also, according to the invention, since the supporting member penetrates the base body of the light-scanning unit, it is made unnecessary to increase the strength of the base body so much by selecting a penetrating position of the supporting member properly, and the degree of freedom of the position where the base body is mounted on the apparatus body is made high. Further, a problem or drawback is solved easily about determination regarding places or positions on the base body to be mounted with the optical elements.

Furthermore, according to the invention, since the light-scanning unit is mounted on the apparatus body via the supporting member, adjusting the mounting position of the light-scanning unit can be realized by finely adjusting the supporting member, and therefore simplification of the structure or configuration can be facilitated.

The supporting member may be formed in such a rod shape as a right column shape or a right cylindrical shape.

According to the invention, since the base body of the light-scanning unit is supported by the supporting member penetrating the base body, even when the strength of the light-scanning unit, particularly the base body, is not increased excessively, such deformation as distortion, flexure, torsion, or the like in the optical elements mounted on the base body is reduced, thereby reducing adverse influence on the image quality of an image recorded and allowing recording and reproducing of a faithful image. Also, according to the invention, since the supporting member penetrates the base body of the light-scanning unit, the degree of freedom of the position where the base body is mounted on the apparatus body is made high, and a problem is solved easily about determination regarding places or portions on the base body to be mounted with the optical elements. Furthermore, adjustment of the mounting position of the light-scanning unit on the apparatus body can be made easy by finely adjusting the supporting member, thereby facilitating simplification of the configuration.

In the image forming apparatus of the invention it is preferable that the direction is a main scanning direction on the photosensitive body moved in a sub-scanning direction.

According to the invention, the direction in which the supporting member extends is a main scanning direction along a rotating axial line of such a photosensitive body as a right cylindrical drum, and therefore, when the base body and the optical elements mounted on the base body are thermally expanded, adverse influence due to thermal deformation such as, particularly, flexure or the like is reduced, so that adverse influence on the image quality of an image recorded can be lowered. The photosensitive body is rotated to be moved in a sub-scanning direction which is a circumferential direction about the rotating axis thereof, so that an image is formed on a surface of the photosensitive body by scanning lines as mentioned above.

According to the invention, the main scanning direction in which a scanning line of laser light or the like is scanned on the photosensitive body moved in the sub-scanning direction is the direction in which the supporting member extends, thereby allowing reduction in adverse influence on the image quality of an image when the base body and the optical elements mounted on the base body are thermally expanded.

In the image forming apparatus of the invention it is preferable that the center of gravity of the light-scanning unit is positioned in the vicinity of the supporting member and vertically below the supporting member.

According to the invention, the center of gravity of the light-scanning unit is defined in the vicinity of the supporting member and vertically below the same, thereby reducing moment acting on the light-scanning unit as much as possible to mount the light scanning-unit on the apparatus body in a stable attitude. Accordingly, in such a case that impact from the outside, such as vibration, acts on the light-scanning unit, the light-scanning unit is prevented from displacing largely, thereby making it possible to record and reproduce a faithful image.

The center of gravity of the light-scanning unit may be positioned on the axial line of the supporting member or much near to the same. Also, the center of gravity of the light-scanning unit may be positioned in the vicinity of the supporting member and may be deviated from vertically below the supporting member.

According to the invention, the center of gravity of the light-scanning unit is positioned in the vicinity of the supporting member and vertically below the same, and therefore a moment acting on the light-scanning unit due to the self-weight of the light-scanning unit is made small as much as possible and the light-scanning unit can be mounted on the apparatus body in a stable attitude. As a result, it is also possible to record and reproduce a faithful image.

In the image forming apparatus of the invention it is preferable that optical elements of the light-scanning unit include:

a light source, provided on the base body, for emitting light of image data for exposing the photosensitive body, a polygon mirror, provided on the base body, for deflecting light from the light source, a driving source, provided on the base body, for rotationally driving the polygon mirror, a mirror, provided on the base body, for introducing light from the polygon mirror to the photosensitive body, and a lens, provided on the base body, for focusing light on the photosensitive body, wherein the supporting member penetrates the base body in a vicinity of the driving source.

According to the invention, since the driving source which is one of the optical elements constituting the light-scanning unit has a weight heavier than the light source, the polygon mirror, the mirror, the lens and the like which are the other optical elements and the supporting member penetrates the base body to support the same in the vicinity of the driving source having such a heavy weight, it is made easy to select the center of gravity of the light-scanning unit in the vicinity of the supporting member, as described above, and further it is made possible to select the center of gravity vertically below the supporting member. Since the driving source having such a heavy weight is disposed in the vicinity of the supporting member, increase in strength of the base body can be suppressed and the structure of the base body is simplified so that an amount of material required can be saved. Thus, the light-scanning unit can be supported on the apparatus body in a stable attitude and the structure for adjusting the position of the light-scanning unit to the apparatus body and holding the light-scanning unit can be made easy.

According to the invention, the heaviest driving source including a motor of a plurality of optical elements fixed on the base body of the light-scanning unit is disposed in the vicinity of the supporting member and therefore it is made easy to select the center of gravity of the light-scanning unit in the vicinity of the supporting member and further it is made possible to select the center of gravity vertically below the supporting member. Thus, increase in the strength of the base body can be suppressed, the structure can be simplified and an amount of material required for the base body can be saved. Also, the light-scanning unit can be supported to the apparatus body in a stable attitude, and further the structure for adjusting the position of the light-scanning unit to the apparatus body and holding the light-scanning unit can be made easy.

BRIEF DESCRIPTION OF THE DRAWINGS

Other and further objects, features, and advantages of the invention will be more explicit from the following detailed description taken with reference to the drawings wherein:

FIG. 1 is a sectional view explaining a mounting structure of the light-scanning unit LSU227a as an example;

FIG. 5 is a partial sectional view seen from a section line 5—5 in FIG. 3;

FIG. 6 is a sectional view showing a structure of holding means 19 for holding the other end portion 300a of the supporting member 300;

FIG. 7 is a sectional view explaining a mounting structure where the light-scanning unit LSU227a is mounted as an example;

FIG. 14 is a simplified horizontal sectional view of the light-scanning unit 727a;

DETAILED DESCRIPTION OF THE PREFERRED EMBODIMENTS

Figure 1:
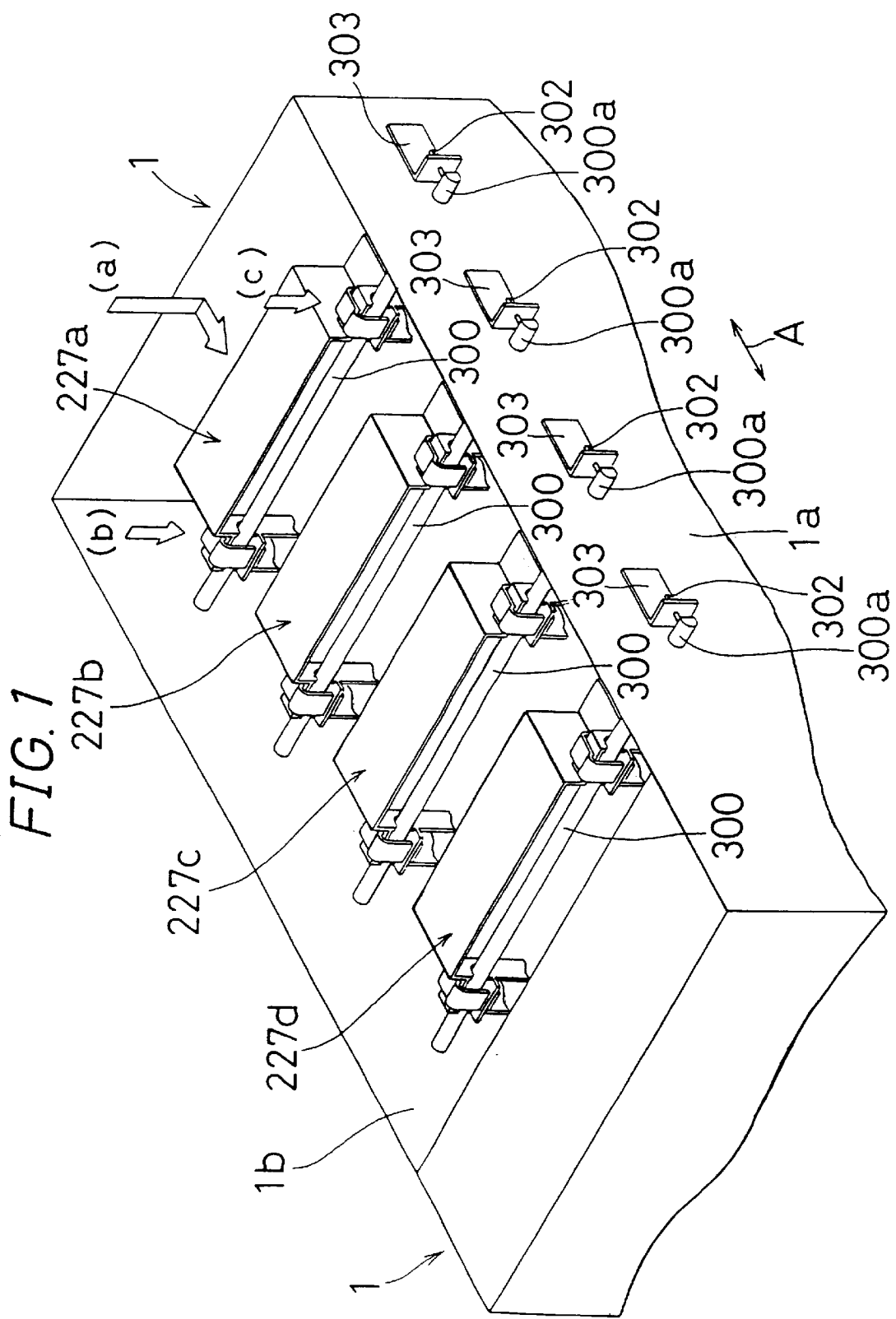
FIG. 1 is a simplified perspective view showing a mounting structure of light-scanning units LSU227a to 227d to respective supporting members 300 in an image forming apparatus which is a color copying machine 1 of an embodiment of the invention.

Now referring to the drawings, preferred embodiments of the invention are described below.

FIG. 1 is a perspective view where an image forming apparatus which is a color copying machine of an embodiment of the invention is partially cut out. In FIG. 1, a mounting state of light-scanning units LSU227a to LSU227d disposed below an image reading section 110 is shown. The respective light-scanning units LSU227a to LSU227d are mounted in a state where they are suspended on supporting members 300 which are respectively bridged between a front panel 1a and a rear panel 1b.

Figure 2:
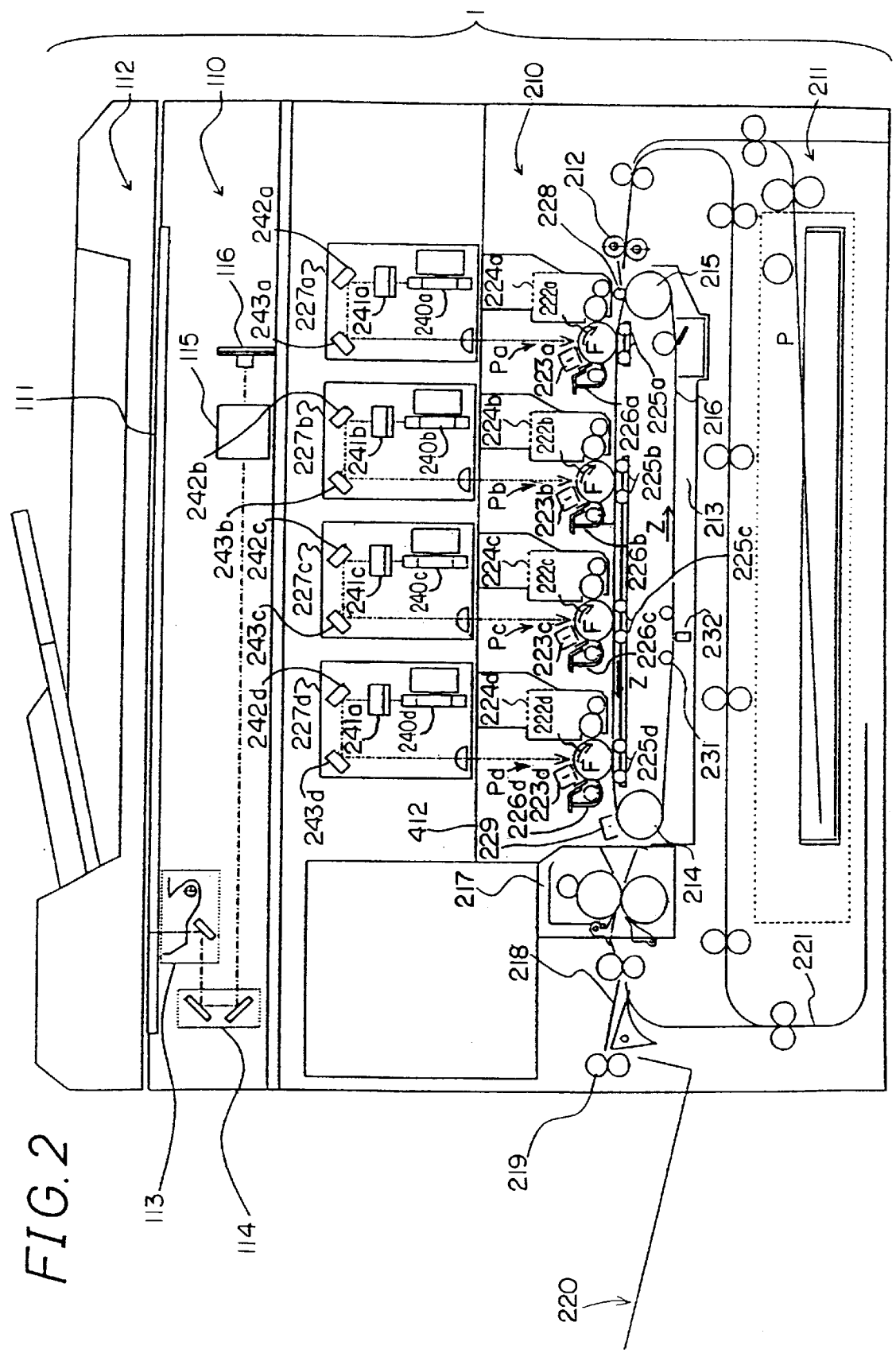
FIG. 2 is a partially cut-out perspective view of the image forming apparatus which is the color copying machine 1 of the embodiment of the invention.

FIG. 2 is a simplified sectional view seen from the front of the entire structure of a digital color copying machine 1 shown in FIG. 1. An original document stand 111 and an operation panel are provided on an upper face of the copying machine body 1, and the image reading section 110 and an image forming section 210 are provided inside the copying machine body 1. A Reversing Automatic Document Feeder (RADF) 112 is equipped on the original document stand 111 in which the Feeder 112 is supported so as to allow opening/closing to the original document stand 111 and has a predetermined positional relationship relative thereto.

The Reversing Automatic Document Feeder 112 conveys an original document such that one side (face) of the original document is opposed to the image reading section 110 at a predetermined position on the original document stand 111. After reading an image on the one side is completed, the Reversing Automatic Document Feeder 112 reverses the original document such that the other side of the original document is opposed to the image reading section 110 at the predetermined position to convey the original document towards the original document stand 111. After images on both sides of one original document are completed, the Reversing Automatic Document Feeder 112 ejects this original document, and then performs conveying operation for both sides of the next original document. The conveying and reversing operations of an original document are controlled regarding the whole operations of the copying machine.

The image reading section 110 is arranged below the original document stand 111 in order to read an image on an original document which has been conveyed to the original document stand 111 by the Reversing Automatic Document Feeder 112. The image reading section 110 has an original document scanning bodies 113, 114 which reciprocate in parallel to the original document stand 111 along a lower face thereof, an optical lens 115, a CCD (charge coupled device) linear sensor 116 which is a photoelectric conversion element.

The original document scanning bodies 113, 114 are respectively constituted with a first scanning unit 113 and a second scanning unit 114. The first scanning unit 113 has an exposure lamp for exposing a surface of an image of an original document and a first mirror for deflecting a reflected light image from the original document towards a predetermined direction, and reciprocates in parallel to an lower face of the original document stand 111 at a predetermined speed while maintaining a predetermined distance to the lower face of the stand 111. The second scanning unit 114 has second and third mirrors for deflecting a reflected light image from the original document deflected by the first mirror of the first scanning unit 113 towards another predetermined direction, and reciprocates in parallel to the first scanning unit 113 while maintaining a predetermined speed relationship to the first scanning unit 113.

The optical lens 115 serves to reduce the reflected light image from the original document deflected by the third mirror of the second scanning unit and focus the reduced light image on a predetermined position on the CCD linear sensor 116.

The CCD linear sensor 116 performs sequential photoelectric conversions on the focused light image to output as electric signals. The CCD linear sensor 116 is a color CCD with three lines which can read a white/black image or a color image to output line data obtained by performing color separation on the image to respective color components of R (red), G (green) andB (blue). Information about the original document image converted to electric signals by the CCD linear sensor 116 is transferred or transmitted to such an image processing section as a microcomputer where the information is subjected to predetermined image data processing.

Configuration of an image forming section 210 and configurations of respective portions associated with the image forming sections 210 will be explained. A paper feeding mechanism 211 for separating recording sheets of paper (recording medium) P stacked and received in a sheet tray one by one to supply each separated sheet of paper towards the image forming section 210 is provided below the image forming section 210. Then, the recording sheets of paper P separated and supplied one by one are subjected to timing control by a pair of register rollers 212 disposed before image forming section 210 to be transported to the image forming section 210. Furthermore, the recording sheet of paper P whose one side has been formed with an image is supplied and conveyed to the image forming section 210 again in time to image forming.

A transferring/conveying belt mechanism 213 is disposed below the image forming section 210. The transferring/conveying belt mechanism 213 is structured such that the recording sheet of paper P is electrostatically attracted to a transferring/conveying belt 216 spanned between a driving roller 214 and an idle roller 215 so as to extend in a parallel manner to be conveyed.

Fusing or thermally fixing means 217 for fusing or fixing a toner image which has been transferred and formed on the recording sheet of paper P is disposed downstream of the transferring/conveying belt mechanism 213 along a paper conveying path. The recording sheet of paper P which has passed through a nip between a pair of fusing or fixing rollers of the thermally fixing means 217 is ejected on to an ejected paper tray 220 mounted on an outer wall of the copying machine body 1 via a conveying direction selector gate 218 by ejecting rollers 219.

The selector gate 218 is to selectively switch a conveying path of a fused recording paper P between a path for ejecting the recording paper P to the copying machine body 1 and another path for supplying the recording paper P towards the image forming section 210 again. After the recording paper P whose conveying direction has been switched towards the image forming section 210 again by the selector gate 218 is reversed via a switchback conveying path 221, the recording paper P is supplied to the image forming section 210 again.

Also, a first image forming station Pa, a second image forming station Pb, a third image forming station Pc and a fourth image forming station Pd are arranged sequentially in this order from the upstream of the paper conveying path so as to be close to the transferring/conveying belt 216 above the transferring/conveying belt 216 in the image forming section 210. The transferring/conveying belt 216 is frictionally driven by the driving roller 214 in a direction shown with arrow Z in FIG. 2 to electrostatically attract the recording paper P fed through the paper feeding mechanism 211, as described above, and conveys the recording paper P to the image forming stations Pa to Pd sequentially.

The image forming stations Pa to Pd each have a substantially identical structure. The respective image forming stations Pa to Pd respectively include photosensitive body drums 222a, 222b, 222c and 222d which are rotationally driven in directions of arrows F in FIG. 2. Charging devices 223a, 223b, 223c and 223d which respectively charge the photosensitive body drums 222a to 222d uniformly, developing devices 224a, 224b, 224c and 224d which respectively develop electrostatic latent images which have been formed on the photosensitive body drums 222a to 222d, discharging devices 225a, 225b, 225c and 225d for transfer which respectively transfer toner images formed on photosensitive body drums 222a to 222d to a recording paper P, and cleaning devices 226a, 226b, 226c and 226d which clean residual toners on the photosensitive body drums 222a to 222d are sequentially disposed along the rotating directions of the respective photosensitive body drums 222a to 222d on the peripheries of the respective photosensitive body drums 222a to 222d.

Laser beam scanner units (hereinafter referred to as LSU) 227a, 227b, 227c and 227d are respectively provided above the respective photosensitive body drums 222a to 222d. The LSUs 227a to 227d are respectively constituted with semiconductor laser elements (not shown) which are light sources for emitting dot light which has been modulated according to image data, polygon mirrors (deflecting devices) 240a, 240b, 240c and 240d which deflect laser beams from the respective semiconductor laser elements in a main scanning direction, fO lenses 241a, 241b, 241c and 241d which focus laser beams which have been deflected by the polygon mirrors 240a, 240b, 240c and 240d on surfaces on the photosensitive body drums 222a to 222d, mirrors 242a, 242b, 242c and 242d, and the like.

From the image processing section, a pixel signal corresponding to a black color component image of a color original document image, a pixel signal corresponding to a cyan color component image of the color original document image, a pixel signal corresponding to a magenta color component image of the color original document image and a pixel signal corresponding to a yellow color component image of the color original document image are respectively input into the LSU 227a, the LUS 227b, the LSU 227c and the LSU 227d. Thereby, electrostatic latent images corresponding to information of the original document image which has been subjected to color conversion are formed on the respective photosensitive body drums 222a to 222d. Black color toner, cyan color toner, magenta color toner and yellow color toner are respectively accommodated in the developing device 224a, the developing device 224b, the developing device 224c and the developing device 224d, and the electrostatic latent images on the photosensitive body drums 222a to 222d are developed with the respective color toners. Thus, the information of the original document image which has been subjected to color conversion performed at the image forming section 210 is reproduced as respective color toner images.

A charging device 228 for attracting a recording paper (a brush) is provided between the first image forming station Pa and the paper feeding mechanism 211. The charging device 228 for attracting charges a surface of the transferring/conveying belt 216 and the recording paper P supplied from the paper feeding mechanism 211 is conveyed from the first image forming station Pa to the fourth image forming station Pd without displacement in a state where the recording paper P has been securely attracted on the transferring/conveying belt 216.

A charge eliminating device 229 is provided immediately above the driving roller 214 between the fourth image forming station Pd and the thermally fixing means 217.

Alternating current for separating the recording paper P which has been attracted on the transferring/conveying belt 216 therefrom is applied to this charge eliminating device.

In the digital copying machine thus configured, a cut-sheet paper P is used as the recording paper P. When the recording paper P is fed out from a paper feeding cassette and is supplied into a guide of a paper feeding/conveying path of the paper feeding mechanism 211, a leading edge portion of the recording paper P is detected by a sensor (not shown) and is stopped once by the pair of registering rollers 212 on the basis of a detection signal output from this sensor to be timed. The recording paper P is fed on to the transferring/conveying belt 216 which is rotating in arrow Z direction of FIG. 1 in time to the respective image forming stations Pa to Pd. At this time, since the predetermined charge has been applied to the transferring/conveying belt 216 by the charging device 228 for attracting as described above, the recording paper P is stably conveyed and supplied while is passing through the respective image forming stations Pa to Pd.

The respective color toner images are formed in the respective image forming stations Pa to Pd, and are superimposed on a supporting face of the recording paper P electrostatically attracted and conveyed by the transferring/conveying belt 216. When transferring images by the fourth image forming station Pd is completed, the recording paper P is peeled from its leading edge portion out of the transferring/conveying belt 216 by a discharging device for charge eliminating to be introduced into the thermally fixing means 217. Finally, the recording paper P on which toner image has been fixed or fused is ejected on to the ejected paper tray 220 from a recording paper ejecting port (not shown).

In the above explanation, light writings are performed by scanning laser beams to expose the photosensitive body by the LSUs 227a to 227d. In another embodiment, an optical system comprising a light-emitting diode array and a focusing lens array (namely, a light-emitting diode array LED head) may be employed instead of the LSU. The LED head has a size smaller than that of the LSU, and has not any movable portion, so that the LED is made silent. Therefore, the LED head is preferably used in an image forming apparatus such as a digital color copying machine of a tandem type requiring a plurality of light-writing units.

Figure 3:
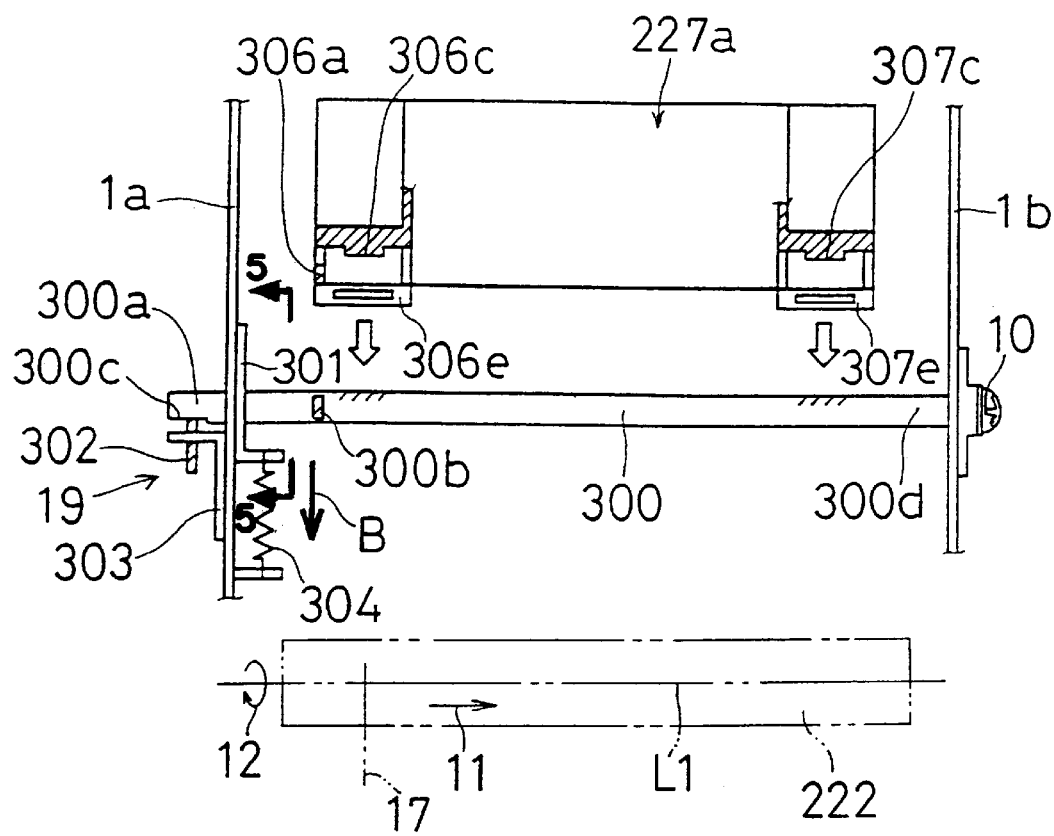

Each supporting member 300 has one end portion 300d which is screwed to the rear panel 1b by a screw 10 to be fixed thereto, as shown in FIG. 3.

Figure 4:
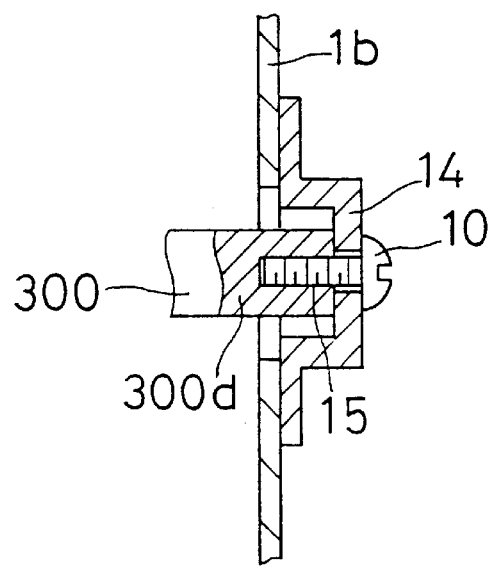
FIG. 4 is a sectional view showing a structure for fixing one end portion 300d of a supporting member 300 by a screw 10.

FIG. 4 is a sectional view of the one end portion 300d of the supporting member 300 and a portion near to the same. A mounting member 14 is fixed on the rear panel 1b. The one end portion 300d of the supporting member 300 is fitted in the mounting member 14, and the screw 10 is screwed and fixed into a screw hole 15 formed in the one end portion 300d coaxially therewith.

FIG. 5 is a simplified sectional view of a portion of the supporting member 300 seen from the section line 5—5 in FIG. 3. The other end portion 300a of the supporting member 300 projects from the front panel 1a to the outside via an opening 13 formed in the front panel 1a. The opening 13 extends in a direction (left and right directions in FIG. 5) perpendicular to the axial line of the supporting member 300 to be formed in an ellipse or oval. An axial direction in which the supporting member 300 extends is parallel to the main scanning direction 11 of the photosensitive body 222 rotationally driven and moved in the sub-scanning direction 12 shown in FIG. 3. Each of the light scanning units 227a to 227*d* (whose subscripts 'a' to 'd' are omitted and which are collectively shown with reference numeral in some cases) scans light in the main scanning direction which is the axial direction of each photosensitive body 222, and exposure of image data starts from a predetermined position 17 of the main scanning direction 11 of the photosensitive body 222 on this scanning line L1. The axial line of the photosensitive body 222 and the scanning line L1 of the main scanning direction 11 are in one plane, the scanning line L1 and the axial line of the supporting member 300 are in another plane, and the direction (left and right directions in FIG. 5) in which the opening 13 extends is approximately perpendicular to the another plane.

The supporting member 300 is engaged with an engaging hole 18 of an L-shaped piece 301 inside the panel on the front panel 1a side, as shown in FIG. 5, and the supporting member 300 is biased or urged in arrow B direction via the L-shaped piece 301 by pulling force of a spring 304 whose one end is fixed.

The other end portion 300*a* of the supporting member 300 is adjusted for positioning and held to the front panel 1a by holding means 19.

FIG. 6 is a sectional view showing the holding means 19 near to the one end portion 300*a* of the supporting member 300. As also shown in FIG. 1, another L-shaped piece 303 is fixed to the front panel 1a outside thereof, and an adjusting bolt 302 is screwed in a screw hole 20 formed in the L-shaped piece 303. The distal or one end portion 300*a* with a receiving face 300*c* notched in a D-shaped section of the supporting member 300 biased in the arrow B direction can be moved in a direction opposed to the B direction by the adjusting bolt. In the supporting member 300, one end thereof on the rear panel 1*b* side serves as a fixed end and the other end thereof on the front panel 1*a* side can be adjusted in a horizontal direction shown with arrow A in FIG. 1. Thereby, the positions of the respective LSUs of each light-scanning unit are finely adjusted so that the scanning lines L1 of the respective light-scanning unit LSUs are arranged to one another within respective planes including axial lines of corresponding respective photosensitive body 222.

Figure 8:
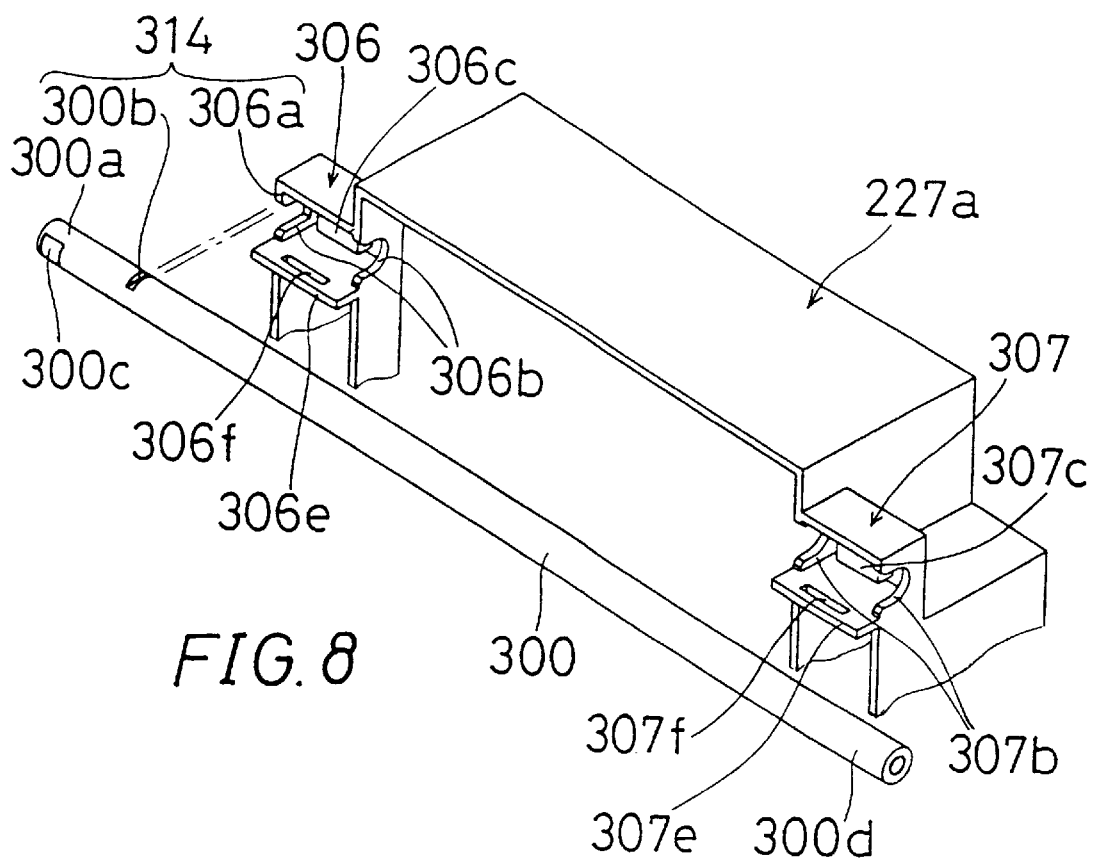
FIG. 8 is a perspective view showing a procedure for mounting the light-scanning unit LSU227a on the supporting member 300, which corresponds to FIG. 3.
Figure 9:
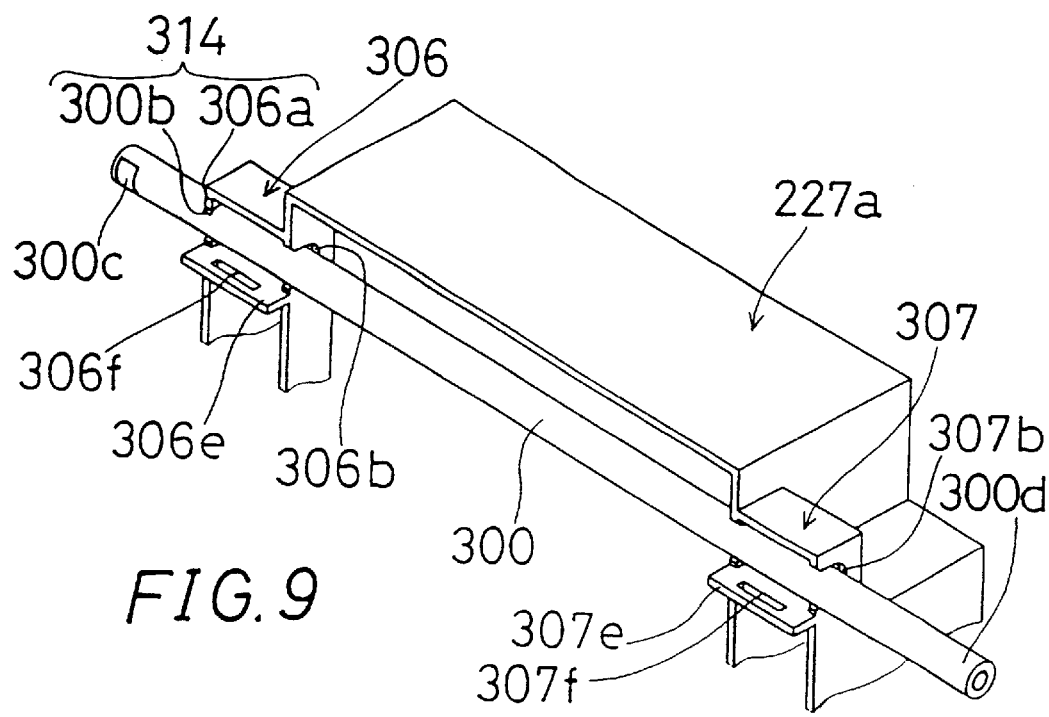
FIG. 9 is a perspective view showing a state where the light-scanning unit LSU227a is mounted on the supporting member 300, which corresponds to FIG. 7.
Figure 10:
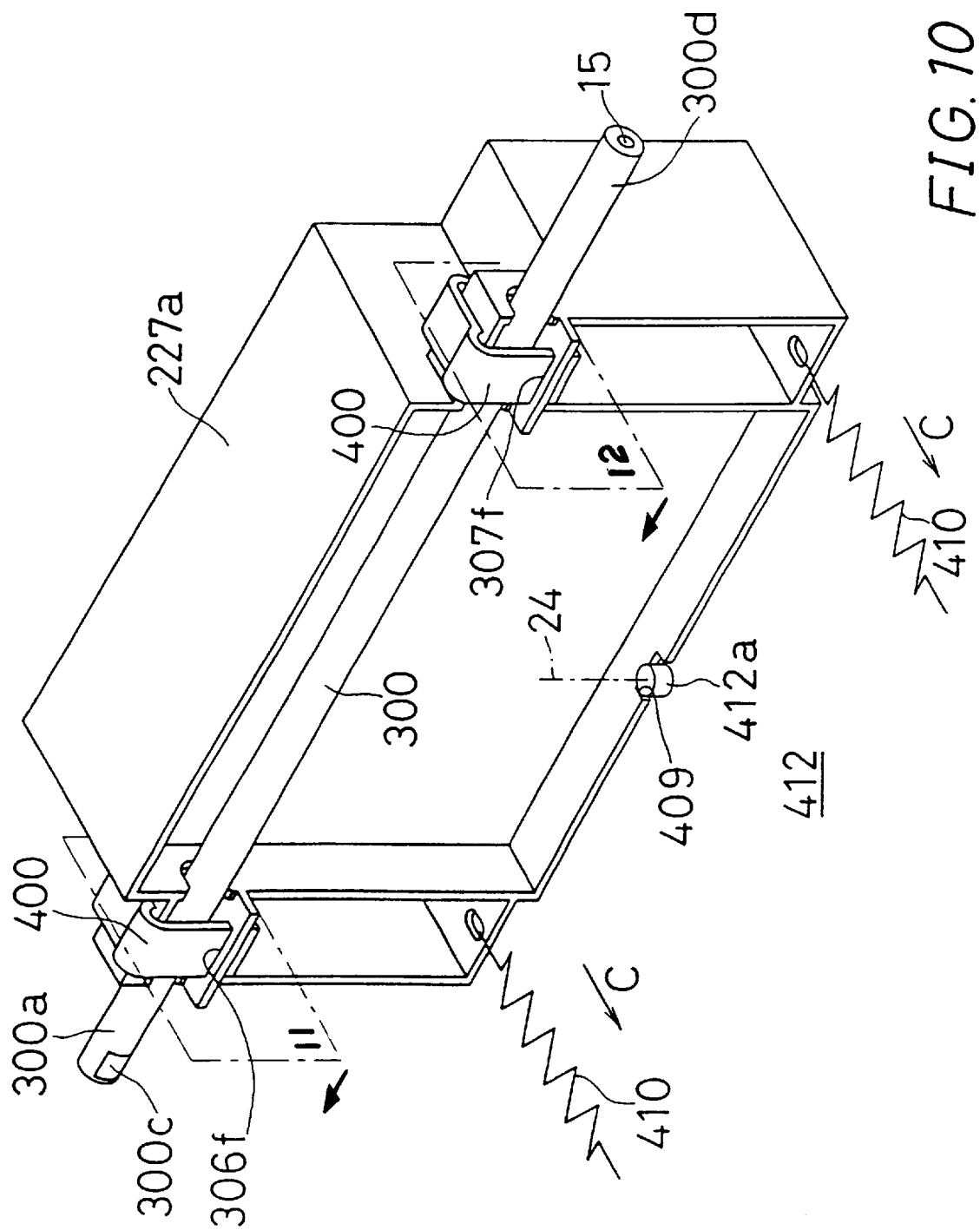
FIG. 10 is a perspective view showing a structure the light-scanning unit LSU227a is mounted on the supporting member 300 by using a, clip member 400.
Figure 11:
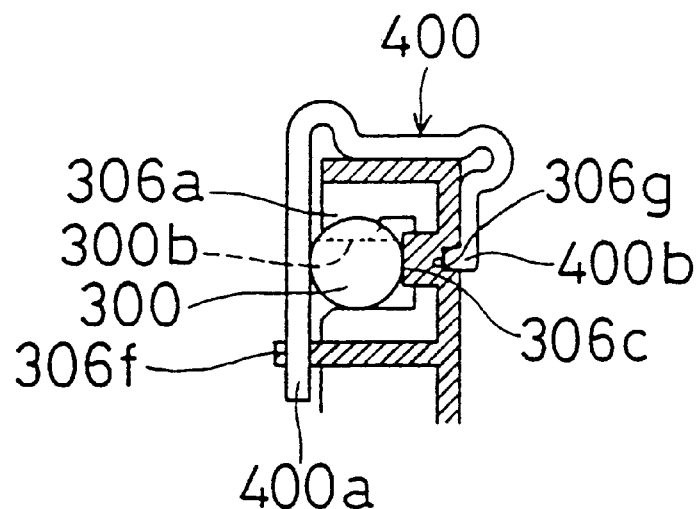
FIG. 11 is a sectional view seen from a section 11 in FIG. 10.
Figure 12:
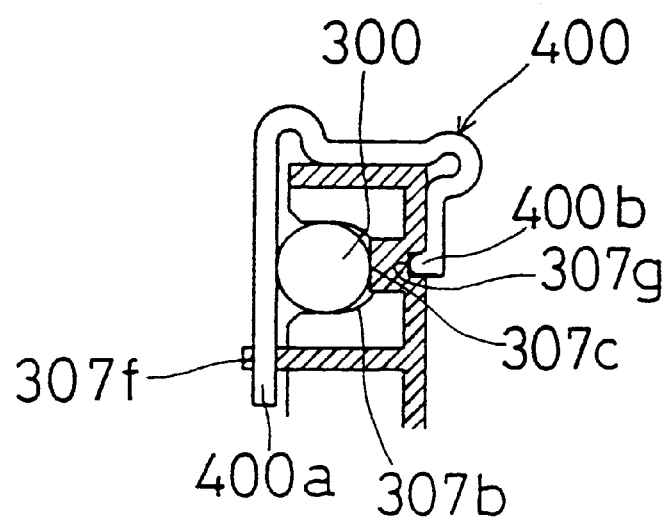
FIG. 12 is a sectional view seen from a section 12 in FIG. 10.

Mounting the light-scanning units or LSUs 227*a* to 227*d* to the respective supporting members 300 is performed in the order of arrows (a), (b) and (c) shown in FIG. 1. How to mount the light-scanning unit LSU 227*a* will be explained as one example with reference to FIGS. 7 to 12. FIG. 3 is a sectional view just before the light-scanning unit LSU 227*a* is moved in parallel to the supporting member 300 to be fixed to the same, and FIG. 7 is a sectional view just after the LSU 227*a* has been moved in parallel to the supporting member 300 to be engaged with the same. FIG. 8 and FIG. 9 are respectively perspective views showing states of FIG. 3 and FIG. 7. FIG. 10 is a perspective view showing a structure where clip members have been mounted in a state where the LSU 227*a* has been mounted to the supporting member 300 and mounting work has been completed, and FIG. 11 and FIG. 12 are respectively sectional views seen from a section 11 and a section 12 in FIG. 10. As shown in FIGS. 3 and 8, a notched portion 300*b* is formed at an upper face of the supporting member 300 which is spaced by a predetermined distance from the front panel 1*a*.

Supporting bodies 306, 307 for mounting and supporting the light-scanning unit LSU 227*a* to the supporting member 300 are formed at upper portions of the light-scanning unit LSU 227*a* and at both sides thereof in a direction parallel to the axial direction of the supporting member 300. Both the supporting bodies 306, 307 are formed integrally with a unit wall (namely, the base body) of the light-scanning unit LSU 227*a*. The base body of each light-scanning unit LSU 227*a* may be made of an aluminum die cast. The supporting body 306 and the supporting body 307 have generally identical structures, but a projecting fitting portion 306*a* which is fitted into and engaged with the notched portion 300*b* provided on the supporting member 300 is formed only on the supporting body 306. The notched portion 300*b* and the fitting portion 306*a* constitute displacement preventing means 314.

As shown in FIG. 7 and FIG. 9, when the light-scanning unit LSU 227*a* is mounted on the supporting member 300, the fitting portion 306*a* is fitted into and engaged with the notched portion 300*b* on the supporting member 300. Thereby, one end portion of the light-scanning unit LSU 227*a* is fixed to the supporting member 300.

Generally arc-shaped notches 306*b*, 307*b* engaged with the supporting member 300 are formed on the supporting bodies 306, 307, and, as shown in FIGS. 7 and 9, the generally arc-shaped notches 306*b*, 307*b* are engaged with the supporting member 300, so that the light-scanning unit LSU 227*a* is put in a suspended state from the supporting member 300.

As also shown in FIG. 5, supporting portions 306*c*, 307*c* which are abutting pieces which abut on the supporting member 300 which has been supported by the generally arc-shaped notches 306*b*, 307*b* are formed on the supporting bodies 306, 307. Since the supporting portions 306*c*, 307*c* have plane-shaped abutting faces, the supporting portions 306*c*, 307*c* come in linear contact with the right column-shaped supporting member 300 and these contacting lines are within a plane including the axial line of the supporting member 300.

Extending pieces 306*e*, 307*e* which are positioned under the supporting member 300 and extend beyond the supporting member 300 when the supporting bodies 306, 307 are engaged with the supporting member 300 are respectively formed on the supporting bodies 306, 307. Opening portions 306*f*, 307*f* in which one end portions 400*a* of clip members 400 are respectively fitted are formed on these extending pieces 306*e*, 307*e*.

As shown in FIGS. 11 and 12, engaging recessed portions 306*g*, 307*g* which are engaged with engaging pieces 400*b* formed at the other end portions of the clip members 400 for retaining are respectively formed on faces opposed to the faces of the supporting bodies 306, 307 where the supporting member 300 is mounted. The clip members 400 are for sandwiching the supporting bodies 306, 307 which has been mounted to the supporting member 300 with resilient forces from the above and grasping them. The clip members 400 are molded products made of synthetic resin or the like. As also shown in FIGS. 10, 11 and 12, sectional configurations of the clip members 400 are generally U shaped or hook-shaped, and respective corner portions of the clip members 400 are each formed in an arc-shape so as to be resilient. When the clip members 400 sandwich the supporting bodies 306, 307, distal end portions 400*a* of the clip members 400 are inserted into the respective opening portions 306*f*, 307*f* formed on the extending pieces 306*e*, 307*e* of the supporting bodies 306, 307, and the engaging pieces 400*b* formed at the other end portions are engaged with the engaging recessed portions 306*g*, 307*g* of the supporting bodies 306, 307, so that the clip members 400 sandwich the respective supporting bodies 306, 307 to mount the light-scanning unit LSU 227*a* to the supporting member 300.

Since the one portion 306a of the supporting body 306 is engaged with the notched portion 300b on the supporting body 306 side (section A side) in the light-scanning unit LSU 227a, the supporting body 306 is fixed in the axial direction of the supporting member 300, but since the supporting body 307 (section B side) on the other side is only sandwiched resiliently by the clip member 400, the supporting body 307 is freely movable relative to the supporting member 300.

As shown in FIG. 10, in an lower portion of the light-scanning unit LSU 227a, an engaging portion 409 which is a notch formed at a lower portion of the light-scanning unit LSU 227a is engaged with pin-shaped engaging piece 412a provided in a standing manner on a bottom plate 412 for a space where the light-scanning unit LSU 227a is disposed, and both side portions positioned on a lower portion of the light-scanning unit LSU 227a are biased in directions C by a pair of springs 410 whose one ends are fixed. The axial line 24 of the engaging piece 412a is perpendicular to the axial line of the photosensitive body 222, and is positioned at an almost center between the pair of springs 410.

The light-scanning unit LSUs 227a to 227d are mounted in this manner. Thereby, even when the temperature inside the digital color copying machine 1 is elevated so that the base body of each light-scanning unit LSU is thermally expanded, since each light-scanning unit LSU is fixed only at the side of the supporting body 306, and each light-scanning unit LSU at the side of the supporting body 307 is kept in contact with the supporting member 300 but each light-scanning unit LSU is supported in an unfixed free state, the amount of expansion of the light-scanning unit LSU is relieved along the main scanning direction 11 towards the rear side of the apparatus. Accordingly, a structure can be obtained where, even when the base body of the light-scanning unit LSU is elongated or extended due to thermal expansion, the extension due to the thermal expansion do not influence the base body of the light-scanning unit LSU as flexure or torsion, and an image can be written on each photosensitive body drum faithfully by each light-scanning unit LSU.

In the digital color copying machine 1, since fixing ends 300b, 306a of the respective light-scanning unit LSUs are aligned at the front side of the apparatus, even when the respective light-scanning unit LSUs are extended due to thermal expansion in the main scanning direction 11, all the light-scanning unit LSUs are extended or elongated in the main scanning directions towards the same side (right direction in FIG. 3, namely the front side). Therefore, all of the respective images formed are displaced or shifted in the same manner so that a color shear can be prevented from occurring.

Each light-scanning unit LSU is constituted to be suspended on the supporting member 300, the supporting portions 306c, 307c abutting on the supporting member 300 of the light-scanning unit LSU are made planer, and the supporting member 300 and the light-scanning unit LSU come in linear contact with each other. Therefore, since frictional forces between the light-scanning unit LSU and the supporting portions 306c, 307c are small, the light-scanning unit LSU can displace freely in the main scanning direction 11 without force as compared with a case of face-contact. In addition, since the supporting member 300 is formed in a column shape, and the light-scanning unit LSU and the supporting member 300 are structured so as to come in contact with each other in the axial direction of the supporting member 300, therefore in a line parallel to the photosensitive body 222 and the scanning direction L1, the light-scanning unit can be slightly rotated about portions of the light-scanning unit which are mounted to the supporting member 300. Accordingly, in this embodiment, there is also an advantage that an angular adjustment of the light-scanning unit LSU is easier than a structure employing, for example, a supporting portion having a rectangular section.

Figure 13:
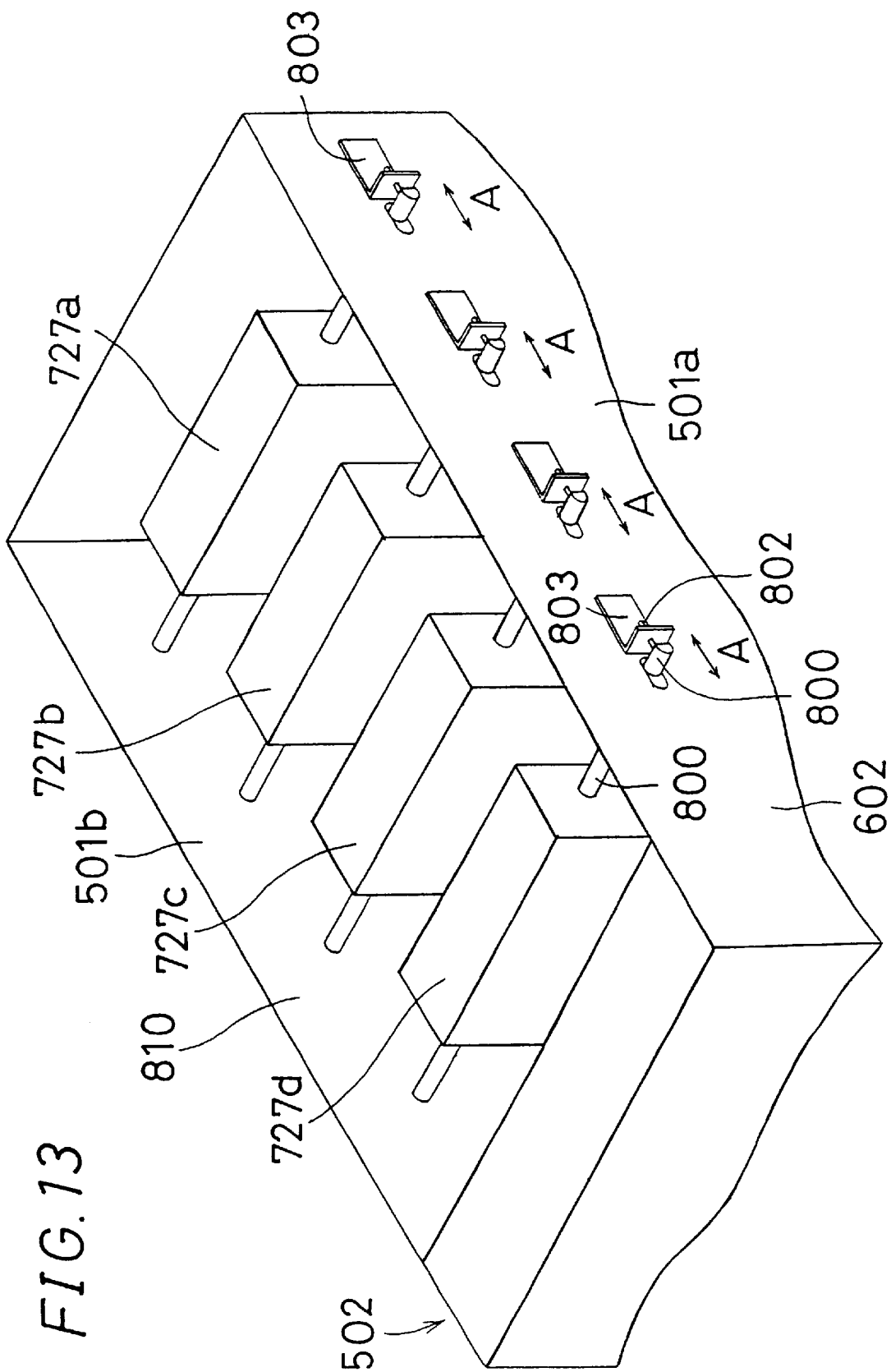
FIG. 13 is a perspective view showing another embodiment of the invention partially take out.

FIG. 13 is a perspective view showing another embodiment which is partially cut out. Incidentally, the structure of the digital color copying machine 1 in FIG. 2 is common to that in this embodiment where the same elements as those in the former are denoted by the same reference numerals and explanation thereof will be omitted. Light-scanning units LSUs 727a to 727d (whose subscripts 'a' to 'd' are omitted and which are collectively denoted with the reference numeral 727 in some cases) for respective colors in the digital color copying machine 1 are provided inside a light-scanning unit space 810 in an apparatus body 602. Reference numerals where subscripts 'a' to 'd' are omitted are collectively by numerals in some cases.

Figure 14:
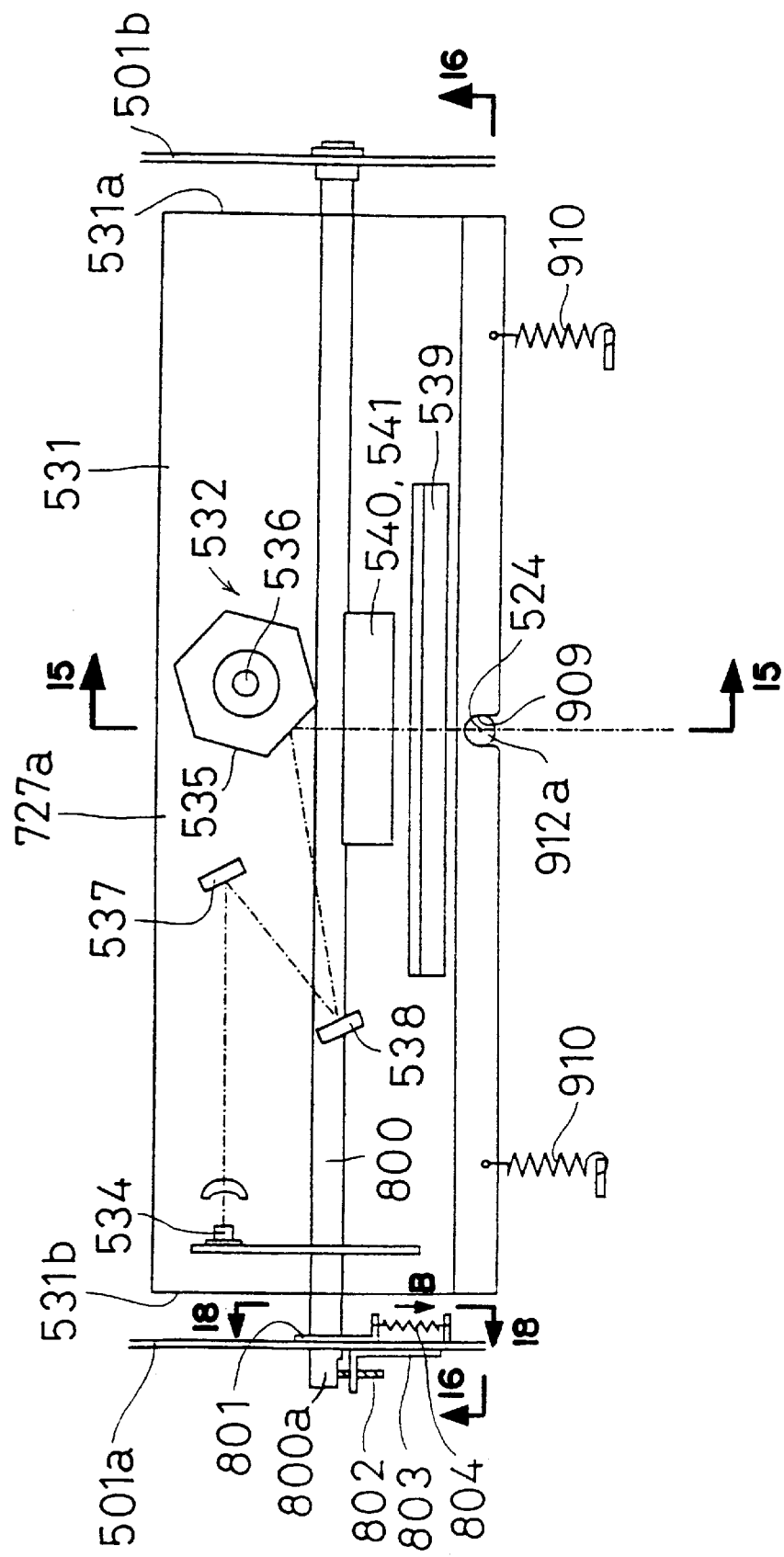
Figure 15:
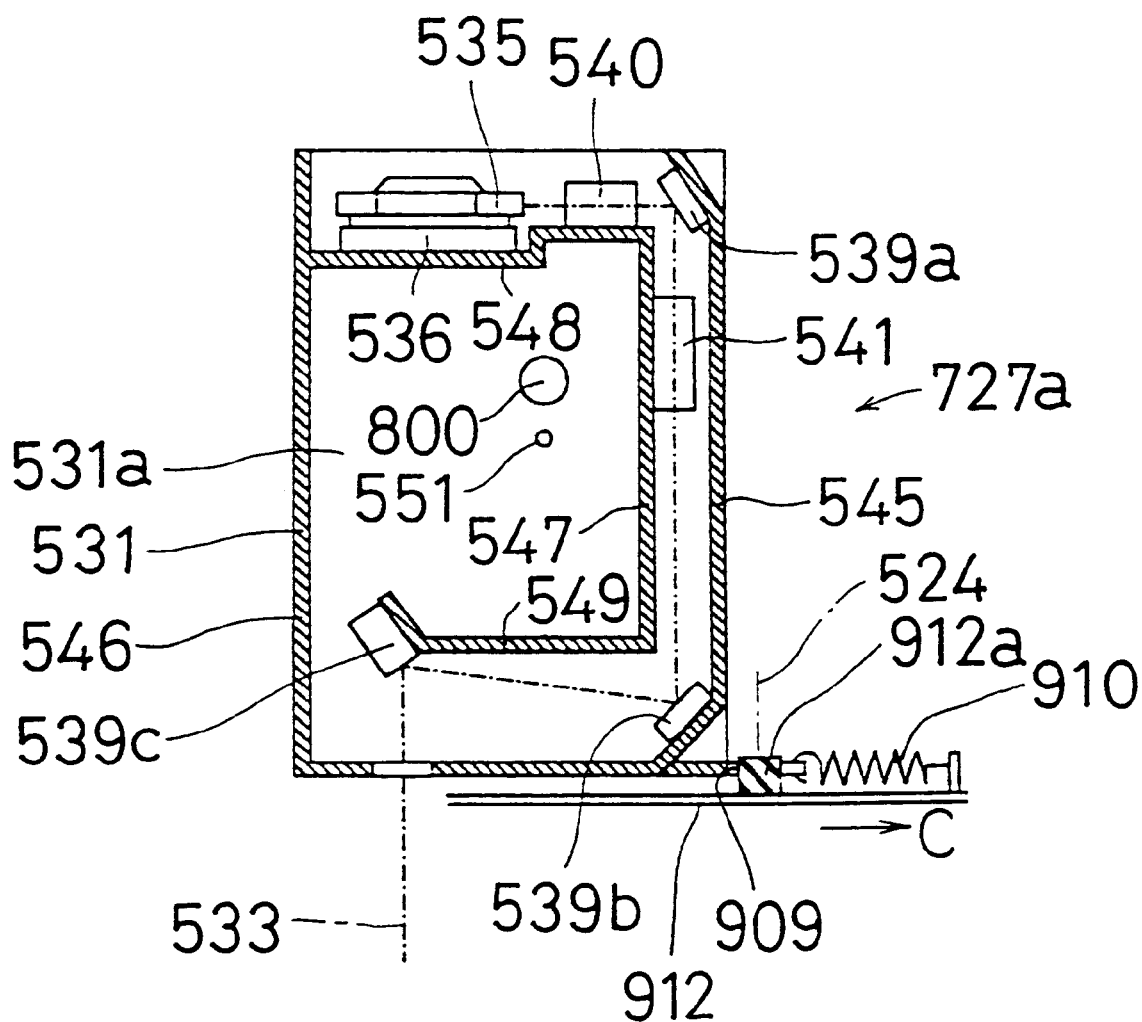
FIG. 15 is a vertical sectional view of the light-scanning unit seen from a section line 15—15 in FIG. 14.
Figure 16:
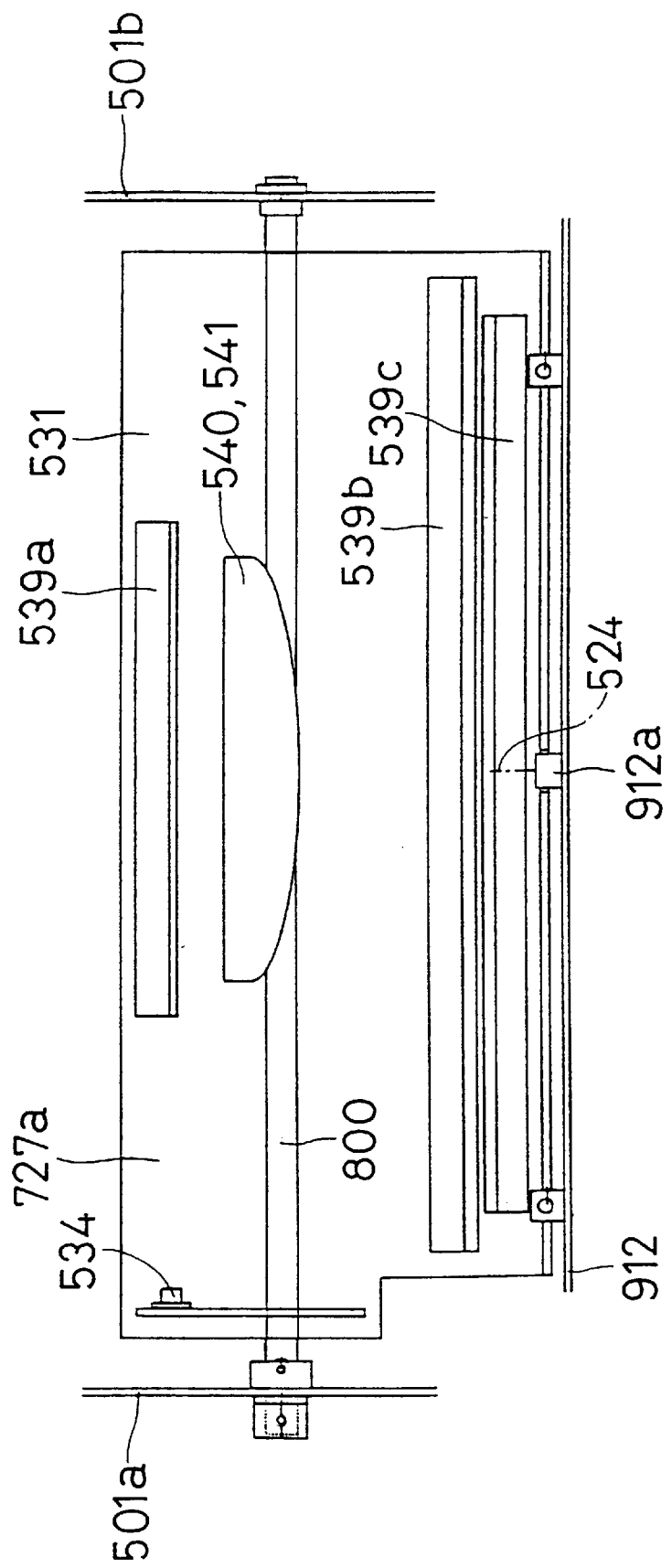
FIG. 16 is a simplified sectional view seen from a line 16—16 in FIG. 14.

FIG. 14 is a horizontal sectional view of the light-scanning unit 727a, FIG. 15 is a vertical sectional view of the light-scanning unit 727a seen from section line 15—15 in FIG. 14, and FIG. 16 is a simplified sectional view seen from line 16—16 in FIG. 14. The remaining light-scanning units 727b to 727d have the same structure as that of the LSU 727a. The light-scanning unit 727a has a synthetic resin-made base body 531 and optical elements 532 provided on the base body 531. In these optical elements 532, a light beam which is a laser light which has been modulated with image data is scanned on a photosensitive body 222a which is a right cylindrical drum in a main scanning direction as a scanning line 533. The main scanning direction is within a plane including the rotating axis of the photosensitive body 222a and is parallel to the rotating axis. The photosensitive body 222a is rotationally driven about the rotating axis in a sub-scanning direction.

The optical elements 532 includes a light source 534 which is a semiconductor element for emitting laser light of image data for exposing the photosensitive body 222a, a polygon mirror 535 for deflecting light from the light source 534, a driving source 536 for rotationally driving the polygon mirror 535, mirrors 537 to 539 for guiding light, and a fO lens 540 for focusing light on the photosensitive body, and these optical elements 532 are fixed to the base body 531. Reference numeral 539 denotes the individual and respective mirrors 539a, 539b and 539c collectively. The optical elements 532 in the light-scanning unit 727a are respectively fixed on walls 545, 546, a supporting wall 547, and mounting plates 548, 549 of the base body 531, and they are arranged in an inverse C-shape in FIG. 15. A supporting member 800 penetrates side walls 531a, 531b in the vicinity of the driving source 536, as described above. The center of gravity 551 of the light-scanning unit 727a is positioned in the vicinity of the horizontal axial line of the supporting member 800 vertically below the axial line. The center of gravity 551 may exist on the axial line of the supporting member 800 or it may be positioned near to the axial line except for vertically below the axial line. Thus, moment acting on the light-scanning unit 727a about the axial line of the supporting member 800 due to the self-weight of the light-scanning unit 727a is made small as much as possible so that the moment can be made zero, for example. Accordingly, the light-scanning unit 727a can be mounted on the apparatus body in a stable state. Also, at a time of adjusting the light-scanning unit 727a for positioning, the light-scanning unit 727a can be displaced or shifted in a stable manner.

Figure 17:
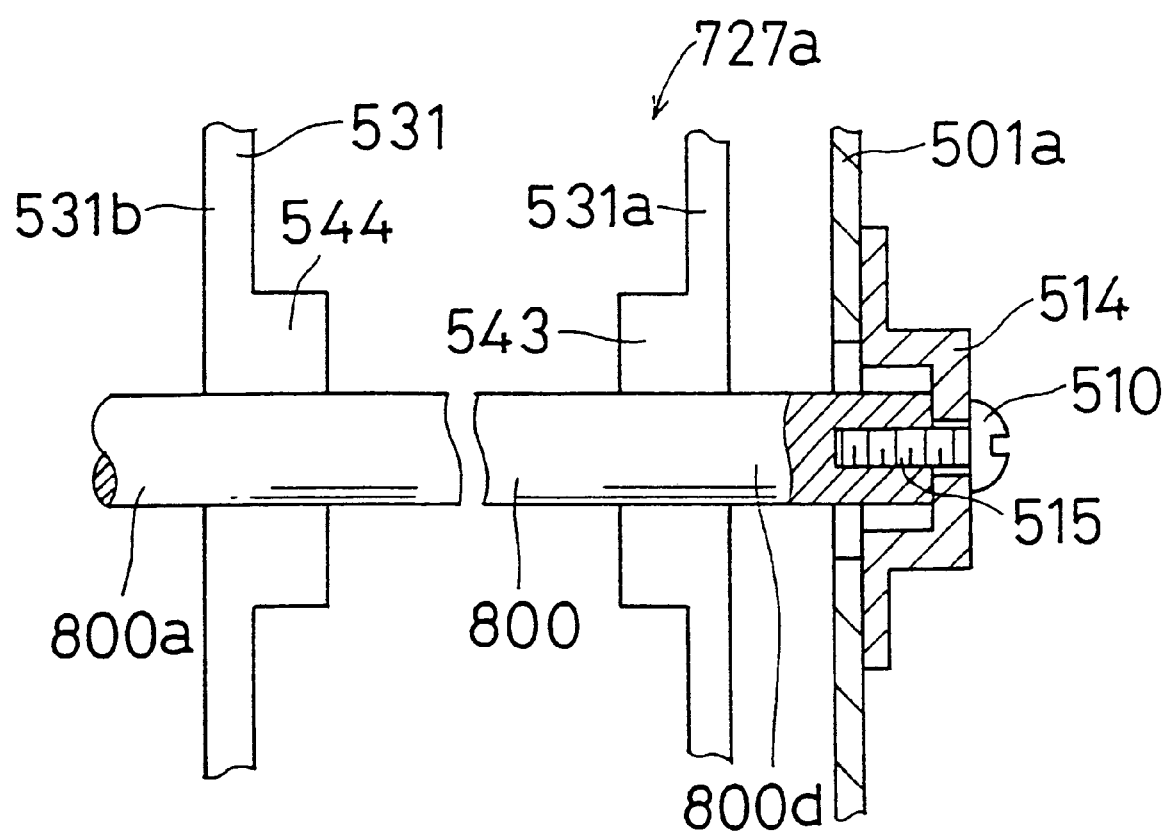
FIG. 17 is a simplified sectional view showing a structure for supporting the light-scanning unit 727a by a supporting member 800.

FIG. 17 is a simplified sectional view showing the structure where the light-scanning unit 727a is supported on the supporting member 800. Boss portions 543, 544 are formed on the side walls 531a, 531b of the base body 531 by making the side walls 531a, 531b thicker in a reinforcing manner, and the supporting member 800 penetrates the boss portions 543, 544. The supporting member 800 is formed in a right column shape or a right cylindrical shape and is made of a metal such as a stainless steel. Synthetic resin material constituting the base body 531 may be made of fiber reinforced plastics such as fiber reinforced polycarbonate.

Since the supporting member 800 penetrates the base body 531 of the light-scanning unit 727a to support the light-scanning unit 727a, the degree of freedom of a fulcrum position of the light-scanning unit 727a can be made high, namely it is easily made possible to properly select a position where there occurs no problem about positional or locating determination between the supporting member 800 and the optical elements 532. Furthermore, by selecting a portion of the base body 531 which the supporting member 800 penetrates properly, distortion occurring in the base body 531 is reduced, even when the strength of the base body 531 is not increased excessively, and adverse influence on the image quality of an image recorded can be reduced, even when distortion occurs in the base body due to thermal expansion.

The supporting member 800 penetrating the both the side walls 531a, 531b of the base body 531 of the light scanning unit 727a is disposed in the vicinity of the optical elements 532, particularly the light source 534, the mirrors 537 to 539, the fO lenses 540, 541, and the like. Accordingly, even when deformation such as distortion or the like occurs in the base body 531 due to thermal expansion or the like, adverse influence due to the deformation can be reduced. As a result, the degree or magnitude where the image quality of an image recorded is influenced adversely due to the deformation caused by the thermal expansion of the base body 531 can be reduced.

As shown in FIG. 17, one end portion 800d of the supporting member 800 is screwed to the rear panel 501a by a screw 510 and fixed to the rear panel 501a. A mounting member 514 is fixed to the rear panel 501a. The one end portion 800d of the supporting member 800 is fitted into the mounting member 514 and the screw 510 is screwed into a screw hole 515 formed on the one end portion 800d coaxially therewith and fixed to the one end portion 800d.

Figure 18:
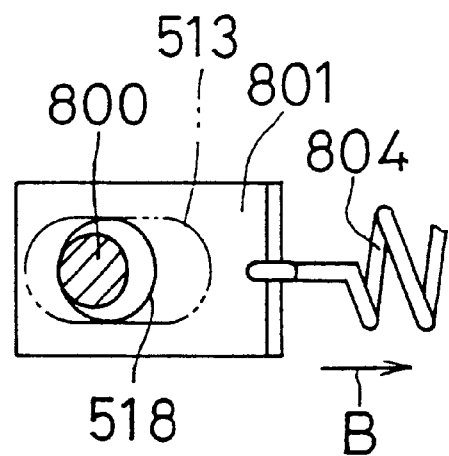
FIG. 18 is a partially simplified sectional view of the supporting member 800 seen from a section line 18—18 in FIG. 14.

FIG. 18 is a simplified sectional view of a portion, including the supporting member 800, seen from section line 18—18 in FIG. 14. The other end portion 800a of the supporting member 800 projects from the front panel 501a to the outside through an opening 513 formed in the front panel 501a. The opening 513 extends in a direction (left and right directions in FIG. 18) perpendicular to the axial line of the supporting member 800 to be formed in an oval shape. An axial direction in which the supporting member 800 extends is parallel to the main scanning direction of the photosensitive body 222 which is rotationally driven and moved in the sub-scanning direction, as described above. Each of the light-scanning units 727a to 727d scans light in the main scanning direction which is the axial direction of each photosensitive body 222, and exposure of image data starts from a predetermined position in the main scanning direction of the photosensitive body 222. The axial line of the photosensitive body 222 and the scanning line of the main scanning direction are within one plane, further the scanning line and the axial line of the supporting member 800 are within another plane, and a direction in which the opening 513 extends in its longitudinal direction (left and right directions in FIG. 18) is generally perpendicular to the another plane.

The supporting member 800 is engaged with an engaging hole 518 of an L-shaped piece 801 inside the panel 501a on the front panel 501a side, as shown in FIG. 14, and is biased in a direction of arrow B by the pulling force of a spring 804 whose one end is fixed via the L-shaped piece 801. The other end portion 800a of the supporting member 800 is adjusted for positioning and held to the front panel 501a by holding means 519.

Figure 19:
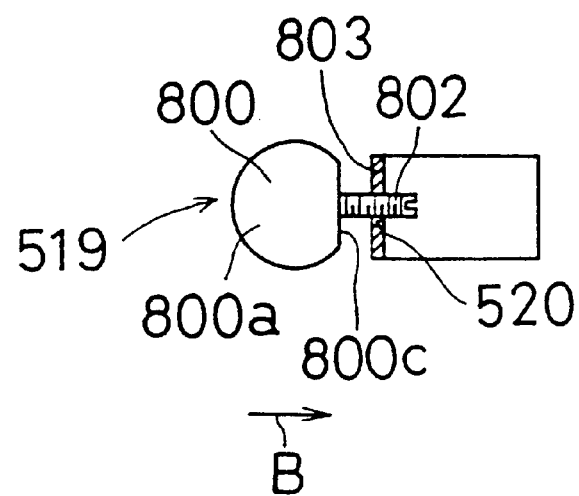
FIG. 19 is a sectional view showing holding means 519 in the vicinity of one end portion 800a of the supporting member 800.

FIG. 19 is a sectional view showing the holding means 519 in the vicinity of the one end portion 800a of the supporting member 800. As also shown in FIG. 13, another L-shaped piece 803 is fixed to the front panel 501a, an adjusting bolt 802 is screwed into a screw hole 520 formed in the L-shaped piece 803. The distal end portion 800a of the supporting member 800 which is biased in the B direction and having a receiving face 800c notched in D-shape can be moved in a direction reverse to the B direction by the adjusting bolt 802. The supporting member 800 which is fixed on the side of the rear panel 501b can be adjusted on the side of the front panel 501a in a horizontal direction shown with arrow A in FIG. 13. Therefore, by finely adjusting the positions of the respective light-emitting portion LSU 727, the scanning lines of the respective light-emitting portion LSU 727 can be aligned with one another within the respective planes in the axial lines of the corresponding respective photosensitive bodies 222.

As shown in FIGS. 15 and 16, an lower portion of the light-emitting portion 727a is engaged with a pin-shaped engaging piece 912a formed in a projecting manner on a bottom plate 912 of the apparatus body through an engaging portion 909 which is a notch formed at the lower portion of the light-emitting portion 727a, and both side portions of the lower portion of the light-emitting portion 727a are respectively connected to one end portions of a pair of springs 910 whose proximal ends (the other end portions of the springs 910) are fixed to the bottom plates 912, so that the light-emitting portion 727a is biased in C direction (refer to FIG. 15). The axial line 524 of the engaging piece 912a is perpendicular to the axial line of the photosensitive body 222 and is positioned substantially between the pair of springs 910.

One portion of the base body 531 of the light-emitting portion 727a, for example, the boss portion 544, is fixed to the supporting member 800 by, for example, a bolt, and the other boss portion 543 is structured so as to be mutually displaceable relative to the supporting member 800 in the axial direction (left and right directions in FIG. 17). Accordingly, the base body 531 is fixed only at its one portion to the supporting member 800. As a result, when the temperature inside the image forming apparatus is elevated and the light-scanning unit 727 is thermally expanded in the axial direction, the base body 531 is allowed to be thermally expanded to extend, and the base body 531 can be relieved in the longitudinal direction of the supporting member 800 by an amount of the extension due to the thermal expansion. Accordingly, there is not any drawback that the extension of the light-emitting portion 727 due to the thermal expansion causes distortion, flexure and torsion. Furthermore, writing-in of electrostatic latent image is started from a predetermined position in the main scanning direction of the photosensitive body 222 by the light-emitting portion 727 with light beam which has been modulated by image data. The position of the boss portion 544 where the base body 531 of the light-emitting portion 727 is provided on the supporting member 800 so as not to displace in the longitudinal direction thereof is selected near to the starting position of image data in the longitudinal direction of the supporting member 800, and therefore in the main scanning direction of the photosensitive body 222. Thereby, the writing-in starting position of image data is prevented from changing due to thermal expansion of the light-emitting portion 727, so that an image corresponding to image data can be accurately formed at a desired position on the photosensitive body.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:

a photosensitive body; and light-scanning unit for forming an electrostatic latent image on the photosensitive body with exposure, the light-scanning unit being supported on a supporting member which penetrates the light-scanning unit, is mounted on an apparatus body and extends in a predetermined direction, so as to be prevented from being displaced at one position of the supporting member in the predetermined direction by displacement preventing means and so as to be mutually displaceable relative to the supporting member at any position other than a position where the displacement preventing means is provided, whereby a displacement due to thermal expansion is allowed.

2. The image forming apparatus of claim 1, wherein the light scanning unit is supported on the supporting member in linear contact therewith, and a position of the linear contact runs parallel to the direction.

3. An image forming apparatus comprising:

a photosensitive body; and light-scanning unit for forming an electrostatic latent image on the photosensitive body with exposure, the light-scanning unit being supported on a supporting member which is mounted on an apparatus body and extends in a predetermined direction, so as to be prevented from being displaced at one position of the supporting member in the predetermined direction by displacement preventing means and so as to be mutually displaceable relative to the supporting member at any position other than a position where the displacement preventing means is provided, wherein the predetermined direction is a main scanning direction, a light beam of the light-scanning unit scans in the main scanning direction on the photosensitive body, where recording of image data starts from a predetermined position on the scanning line in the main scanning direction of the photosensitive body, and the displacement preventing means is displaced near to the image data starting position in the direction.

4. An image forming apparatus comprising:

a photosensitive body; and light-scanning unit for forming an electrostatic latent image on the photosensitive body with exposure, the light-scanning unit being supported on a supporting member which is mounted on an apparatus body and extends in a predetermined direction, so as to be prevented from being displaced at one position of the supporting member in the predetermined direction by displacement preventing means and so as to be mutually displaceable relative to the supporting member at any position other than a position where the displacement preventing means is provided, wherein sets of photosensitive bodies and light-scanning units are sequentially disposed respectively for a plurality of colors along a conveying path of a recording sheet of paper, and supporting members which respectively support the light-scanning units extend in parallel with the direction and are provided so as to prevent the respective light-scanning units from being displaced relative to the supporting members in the direction at corresponding positions along the direction.

5. An image forming apparatus comprising:

a photosensitive body; and light-scanning unit for forming an electrostatic latent image on the photosensitive body with exposure, the light-scanning unit being supported on a supporting member which is mounted on an apparatus body and extends in a predetermined direction, so as to be prevented from being displaced at one position of the supporting member in the predetermined direction by displacement preventing means and so as to be mutually displaceable relative to the supporting member at any position other than a position where the displacement preventing means is provided, wherein the supporting member has one end portion held by an apparatus body and the other end portion provided displaceably in a direction perpendicular to the predetermined direction relative to the apparatus body, the other end portion is provided with holding means for positioning and adjusting the supporting member relative to the apparatus body to hold the same, the light-scanning unit has a pair of supporting portions spaced from each other in the predetermined direction of the supporting member, and the light-scanning unit is provided on the apparatus body so as to be angularly displaced about an axial line perpendicular to the direction at a position shifted from the supporting member in a side direction.

6. An image forming apparatus comprising:

a photosensitive body; and a light-scanning unit for forming an electrostatic latent image on the photosensitive body with exposure, the light-scanning unit comprising a base body, and optical elements for exposure provided on the base body, wherein a supporting member which is mounted on an apparatus body and extends in a predetermined direction penetrates the base body to hold the base body.

7. The image forming apparatus of claim 6, wherein the direction is a main scanning direction on the photosensitive body moved in a sub-scanning direction.

8. The image forming apparatus of claim 6, wherein optical elements of the light-scanning unit include:

a light source, provided on the base body, for emitting light of image data for exposing the photosensitive body, a polygon mirror, provided on the base body, for deflecting light from the light source, a driving source, provided on the base body, for rotationally driving the polygon mirror, a mirror, provided on the base body, for introducing light from the polygon mirror to the photosensitive body, and a lens, provided on the base body, for focusing light on the photosensitive body, wherein the supporting member penetrates the base body in a vicinity of the driving source.

9. An image forming apparatus comprising:

a photosensitive body; and a light-scanning unit for forming an electrostatic latent image on the photosensitive body with exposure.

the light-scanning unit comprising a base body, and optical elements for exposure provided on the base body, wherein a supporting member which is mounted on an apparatus body and extends in a predetermined direction penetrates the base body to hold the base body, wherein the center of gravity of the light-scanning unit is positioned in the vicinity of the supporting member and vertically below the supporting member.

* * * * *